(12) United States Patent
Monroe

(10) Patent No.: US 7,733,371 B1
(45) Date of Patent: Jun. 8, 2010

(54) DIGITAL SECURITY MULTIMEDIA SENSOR

(76) Inventor: David A. Monroe, 740 Lincoln Center, 7800 IH 10 West, San Antonio, TX (US) 78230

(*) Notice: Subject to any disclaimer, the term of this patent is extended or adjusted under 35 U.S.C. 154(b) by 410 days.

(21) Appl. No.: 11/272,647

(22) Filed: Nov. 14, 2005

Related U.S. Application Data

(63) Continuation of application No. 09/593,361, filed on Jun. 14, 2000, now Pat. No. 7,023,913.

(51) Int. Cl.
 *H04N 7/18* (2006.01)
(52) U.S. Cl. .................. 348/153; 348/155; 348/154; 348/169; 348/143; 348/159; 348/152; 375/240; 375/240.25; 375/240.26; 375/240.01; 382/232; 382/233
(58) Field of Classification Search .......... 348/153, 348/169, 154, 155, 143, 159, 152; 375/240, 375/240.25, 240.26, 240.01; 382/232, 233
See application file for complete search history.

(56) References Cited

U.S. PATENT DOCUMENTS

| | | | |
|---|---|---|---|
| 4,163,283 A | 7/1979 | Darby | |
| 4,179,695 A | 12/1979 | Levine et al. | |
| 4,197,536 A | 4/1980 | Levine | |

(Continued)

FOREIGN PATENT DOCUMENTS

EP          220752          5/1987

(Continued)

OTHER PUBLICATIONS

Apr. 1966, Apollo Unified S-Band System, NASA-Goddard Space Flight Center, Greenbelt, Maryland.

(Continued)

*Primary Examiner*—Shawn An

(57) ABSTRACT

A fully digital camera system provides high-resolution still image and streaming video signals via a network to a centralized, server supported security and surveillance system. The digital camera for collects an image from one or more image transducers, compressing the image and sending the compressed digital image signal to a receiving station over a digital network. A plurality of image transducers or sensors may be included in a single camera unit, providing array imaging such as full 360 degree panoramic imaging, universal or spherical imaging and field imaging by stacking or arranging the sensors in an array. The multiple images are then compressed and merged at the camera in the desired format to permit transmission of the least amount of data to accomplish the desired image transmission. The camera also employs, or connects to, a variety of sensors other than the traditional image sensor. Sensors for fire, smoke, sound, glass breakage, motion, panic buttons, and the like, may be embedded in or connected to the camera. Data captured by these sensors may be digitized, compressed, and networked to detect notable conditions. An internal microphone and associated signal processing system may be equipped with suitable signal processing algorithms for the purpose of detecting suitable acoustic events and their location. In addition, the camera is equipped with a pair of externally accessible terminals where an external sensor may be connected. In addition, the camera may be equipped with a short-range receiver that may detect the activation of a wireless 'panic button' carried by facility personnel. This 'panic button' may employ infrared, radio frequency (RF), ultrasonic, or other suitable methods to activate the camera's receiver.

10 Claims, 41 Drawing Sheets

U.S. PATENT DOCUMENTS

| | | | |
|---|---|---|---|
| 4,516,125 A | 5/1985 | Schwab et al. | |
| 4,831,438 A | 5/1989 | Bellman, Jr. et al. | |
| 4,845,629 A | 7/1989 | Murga | |
| 4,857,912 A | 8/1989 | Everett, Jr. et al. | |
| 4,891,650 A | 1/1990 | Sheffer | |
| 4,910,692 A | 3/1990 | Outram | |
| 5,027,104 A | 6/1991 | Reid | |
| 5,027,114 A | 6/1991 | Kawashime et al. | |
| 5,091,780 A | 2/1992 | Pomerleau | |
| 5,109,278 A * | 4/1992 | Erickson et al. | 348/153 |
| 5,111,291 A | 5/1992 | Erickson | |
| 5,166,746 A | 11/1992 | Sato et al. | |
| 5,218,367 A | 6/1993 | Sheffer et al. | |
| 5,243,340 A | 9/1993 | Norman et al. | |
| 5,243,530 A | 9/1993 | Stanifer et al. | |
| 5,258,837 A * | 11/1993 | Gormley | 348/441 |
| 5,268,698 A | 12/1993 | Smith, Sr. et al. | |
| 5,283,643 A | 2/1994 | Fujimoto | |
| 5,321,615 A | 6/1994 | Frisbie et al. | |
| 5,334,982 A | 8/1994 | Owen | |
| 5,350,890 A | 9/1994 | Rose et al. | |
| 5,400,031 A | 3/1995 | Fitts | |
| 5,408,330 A | 4/1995 | Squicciarini et al. | |
| 5,432,838 A | 7/1995 | Purchase | |
| 5,440,337 A | 8/1995 | Henderson et al. | |
| 5,440,343 A | 8/1995 | Parulski | |
| 5,448,243 A | 9/1995 | Bethke et al. | |
| 5,463,595 A | 10/1995 | Rodhall et al. | |
| 5,469,371 A | 11/1995 | Bass | |
| 5,497,149 A | 3/1996 | Fast | |
| 5,508,736 A | 4/1996 | Cooper | |
| 5,530,440 A | 6/1996 | Denzer et al. | |
| 5,553,609 A | 9/1996 | Chen et al. | |
| 5,557,254 A | 9/1996 | Johnson et al. | |
| 5,557,278 A | 9/1996 | Piccirillo et al. | |
| 5,598,167 A | 1/1997 | Zijderhand | |
| 5,612,668 A | 3/1997 | Scott | |
| 5,627,753 A | 5/1997 | Brankin et al. | |
| 5,629,691 A | 5/1997 | Jain | |
| 5,636,122 A | 6/1997 | Shah et al. | |
| 5,642,285 A | 6/1997 | Woo | |
| 5,666,157 A | 9/1997 | Avid | |
| 5,667,979 A | 9/1997 | Squicciarini | |
| 5,670,961 A | 9/1997 | Tomita et al. | |
| 5,677,979 A | 10/1997 | Squiccierini | |
| 5,689,442 A | 11/1997 | Swanson | |
| 5,712,679 A | 1/1998 | Coles | |
| 5,712,899 A | 1/1998 | Pace, II | |
| 5,714,948 A | 2/1998 | Farmakis et al. | |
| 5,742,336 A | 4/1998 | Lee | |
| 5,751,346 A | 5/1998 | Dozler | |
| 5,777,551 A | 7/1998 | Hess | |
| 5,777,580 A | 7/1998 | Janky et al. | |
| 5,793,416 A | 8/1998 | Rostoker et al. | |
| 5,825,283 A | 10/1998 | Camhi | |
| 5,835,059 A | 11/1998 | Nadel et al. | |
| 5,850,180 A | 12/1998 | Hess | |
| 5,867,804 A | 2/1999 | Pilley et al. | |
| 5,917,405 A | 6/1999 | Joao | |
| 5,926,210 A | 7/1999 | Hackett et al. | |
| 5,933,098 A | 8/1999 | Haxton | |
| 5,938,706 A | 8/1999 | Feldman | |
| 5,974,158 A | 10/1999 | Auty et al. | |
| 5,983,161 A | 11/1999 | Lemelson et al. | |
| 5,999,116 A | 12/1999 | Evera | |
| 6,002,427 A | 12/1999 | Kipust | |
| 6,009,356 A | 12/1999 | Monroe | |
| 6,067,571 A | 5/2000 | Igarashi et al. | |
| 6,069,655 A | 5/2000 | Seeley | |
| 6,078,850 A | 6/2000 | Kane et al. | |
| 6,084,510 A | 7/2000 | Lemelson et al. | |
| 6,092,008 A | 7/2000 | Batoman | |
| 6,100,964 A | 8/2000 | De Cremiers | |
| 6,133,941 A | 10/2000 | Ono | |
| 6,154,658 A | 11/2000 | Caci | |
| 6,157,317 A | 12/2000 | Walker | |
| 6,181,373 B1 | 1/2001 | Coles | |
| 6,195,609 B1 | 2/2001 | Pilley et al. | |
| 6,226,031 B1 | 5/2001 | Barraclough et al. | |
| 6,246,320 B1 | 6/2001 | Monroe | |
| 6,259,475 B1 | 7/2001 | Ramachandran et al. | |
| 6,271,752 B1 * | 8/2001 | Vaios | 340/541 |
| 6,275,231 B1 | 8/2001 | Obradovich | |
| 6,278,965 B1 | 8/2001 | Glass et al. | |
| 6,282,488 B1 | 8/2001 | Castor et al. | |
| 6,292,098 B1 | 9/2001 | Ebata | |
| 6,323,897 B1 * | 11/2001 | Kogane et al. | 348/159 |
| 6,356,625 B1 | 3/2002 | Castelani | |
| 6,385,772 B1 | 5/2002 | Courtney | |
| 6,386,038 B1 * | 5/2002 | Lewis et al. | 73/587 |
| 6,424,370 B1 | 7/2002 | Courtney | |
| 6,462,697 B1 | 10/2002 | Klamer et al. | |
| 6,476,858 B1 | 11/2002 | Ramirez Diaz et al. | |
| 6,504,479 B1 | 1/2003 | Lemons | |
| 6,522,352 B1 | 2/2003 | Liao et al. | |
| 6,525,761 B2 | 2/2003 | Sato et al. | |
| 6,549,130 B1 | 4/2003 | Joao | |
| 6,556,241 B1 | 4/2003 | Yoshimura et al. | |
| 6,570,610 B1 | 5/2003 | Kipust | |
| 6,628,835 B1 | 9/2003 | Brill | |
| 6,631,322 B1 * | 10/2003 | Arthur et al. | 701/211 |
| 6,646,676 B1 | 11/2003 | DeGrace | |
| 6,662,649 B1 | 12/2003 | Knight et al. | |
| 6,675,386 B1 | 1/2004 | Hendricks et al. | |
| 6,698,021 B1 | 2/2004 | Amini | |
| 6,720,990 B1 | 4/2004 | Walker et al. | |
| 6,891,566 B2 * | 5/2005 | Marchese | 348/211.3 |
| 7,111,305 B2 | 9/2006 | Ohi et al. | |
| 2003/0071899 A1 | 4/2003 | Joao | |
| 2005/0055727 A1 | 3/2005 | Creamer et al. | |
| 2005/0138083 A1 | 6/2005 | Rastegar | |

FOREIGN PATENT DOCUMENTS

| | | |
|---|---|---|
| EP | 232031 | 8/1987 |
| EP | 532110 | 3/1993 |
| EP | 209397 | 7/1993 |
| EP | 613109 | 8/1994 |
| EP | 613110 | 8/1994 |
| EP | 613111 | 8/1994 |
| EP | 744630 | 5/1996 |
| EP | 744630 | 11/1996 |
| EP | 785536 | 7/1997 |
| EP | 613111 | 8/1998 |
| JP | 6-301898 | 10/1994 |
| JP | 9-282600 | 10/1997 |
| JP | HEI-10-66058 | 3/1998 |
| JP | A-10-155040 | 6/1998 |
| JP | 9-251599 | 4/1999 |
| JP | 11-160424 | 6/1999 |
| WO | WO90/04242 | 4/1990 |
| WO | WO95/27910 | 10/1995 |
| WO | WO96/12265 | 4/1996 |
| WO | WO97/23096 | 6/1997 |
| WO | WO97/37336 | 10/1997 |
| WO | WO9737336 | 10/1997 |
| WO | WO98/52174 | 11/1998 |
| WO | WO98/52174 | 11/1999 |
| WO | WO00/36807 | 6/2000 |

OTHER PUBLICATIONS

Apr. 1966, Apollo Unified S-Band System, NASA-Goddard Space Flight Center, Greenbelt, Maryland.

Nov. 24, 1976, TELEXIS ViaNet General Information Booklet Version 1.3.

2000, ViaNet 3000 Administrator's Manual Version 1.1—NetXpress Video by TELEXIS, Kanata, Ontario, Canada.

1999 Vianet 3000 Operator Manual Version 1.0—NetXpress Video by TELEXIS, Kanata, Ontario, Canada.

1999 ViaNet 3000 Administrator Manual Version 1.0—NetXpress Video by TELEXIS, Kanata, Ontario, Canada.

1999 ViaNet 3000 Instruction Manual Operator's Revision 1—NetXpress Video by TELEXIS, Kanata, Ontario, Canada.

* cited by examiner

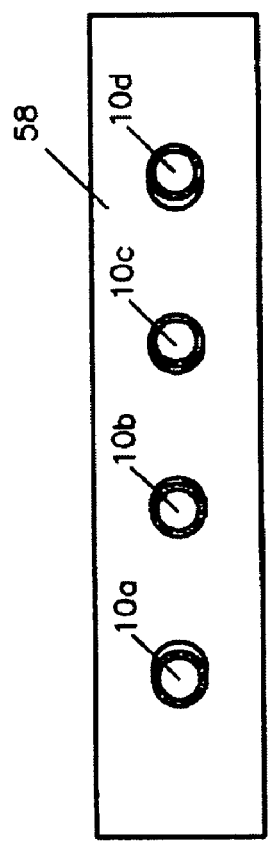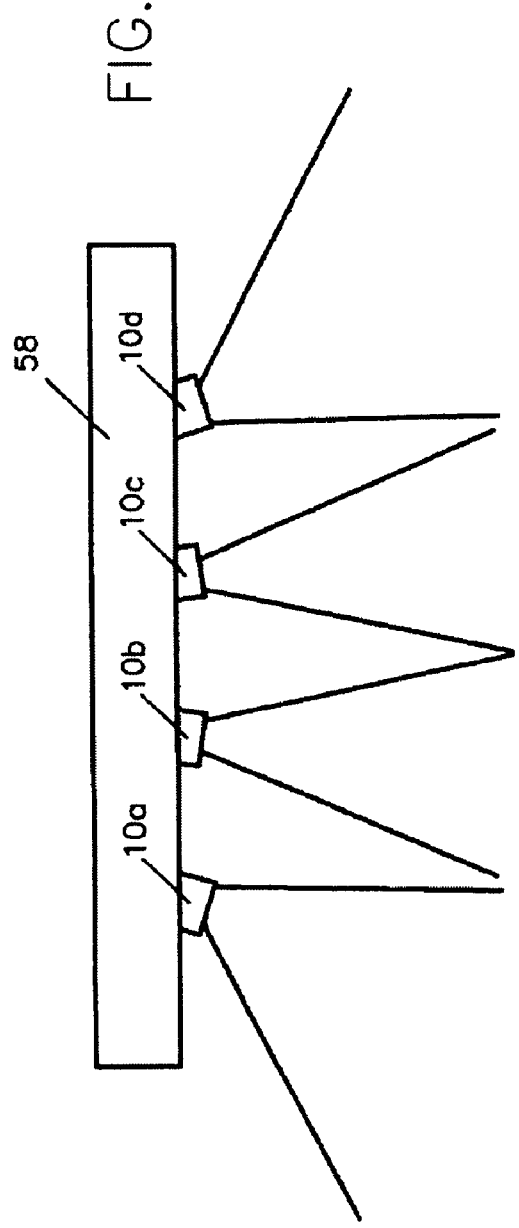

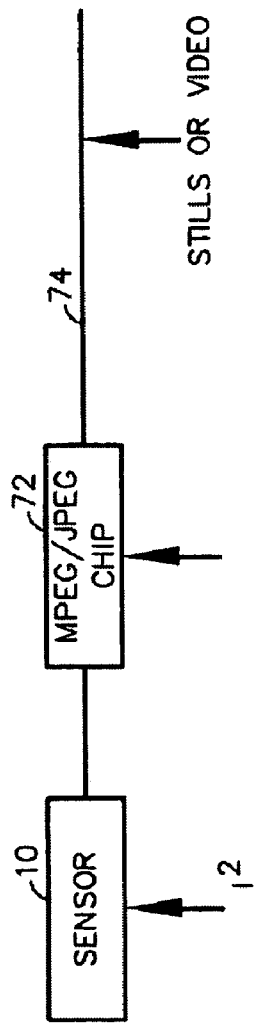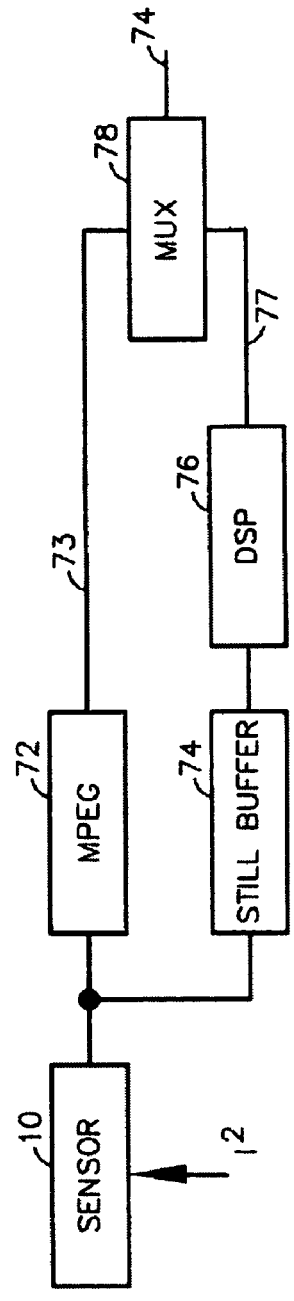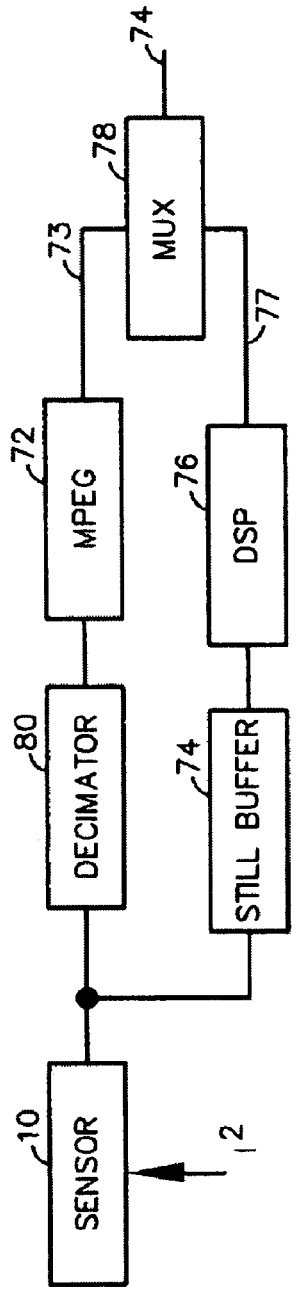

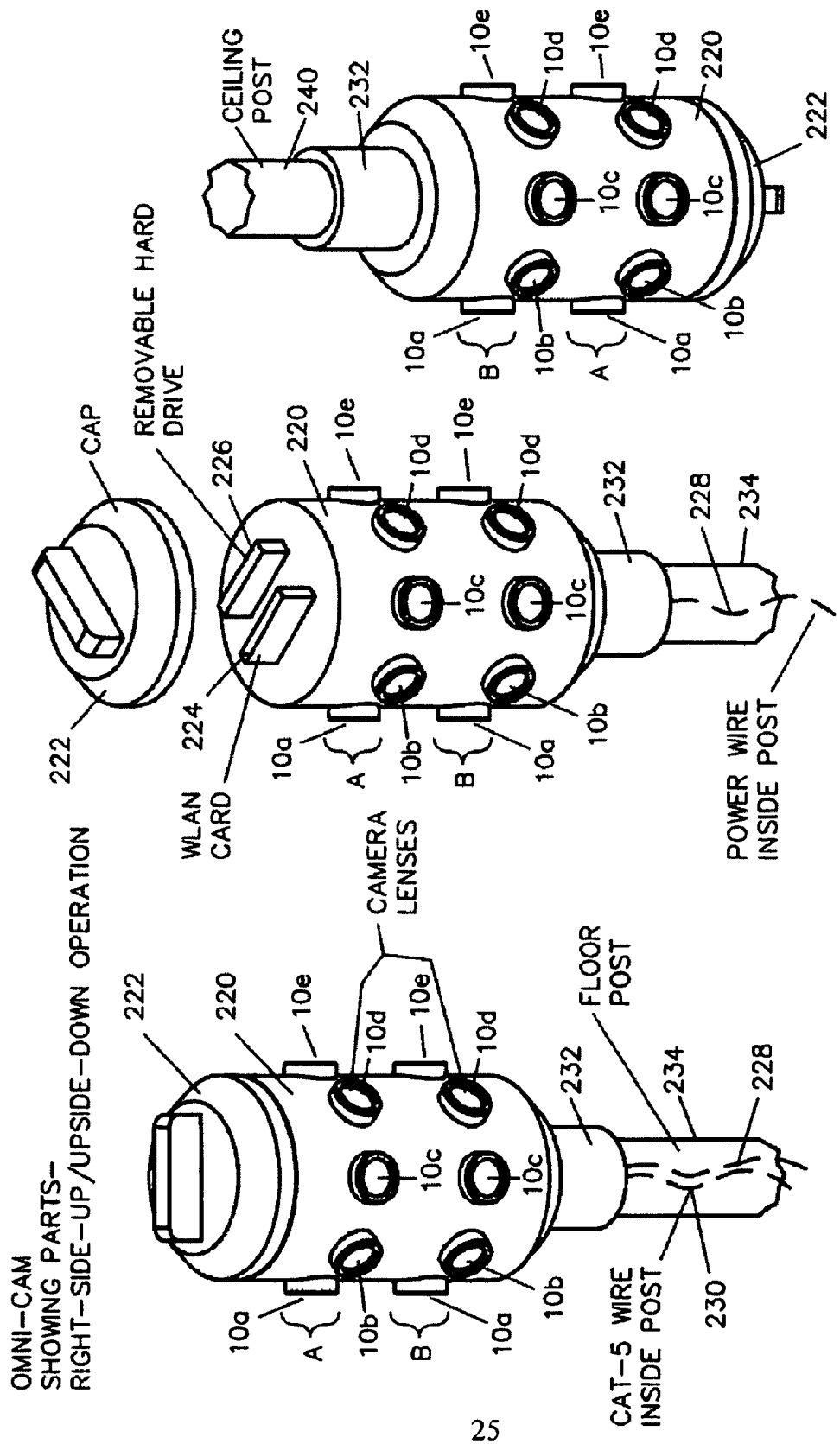

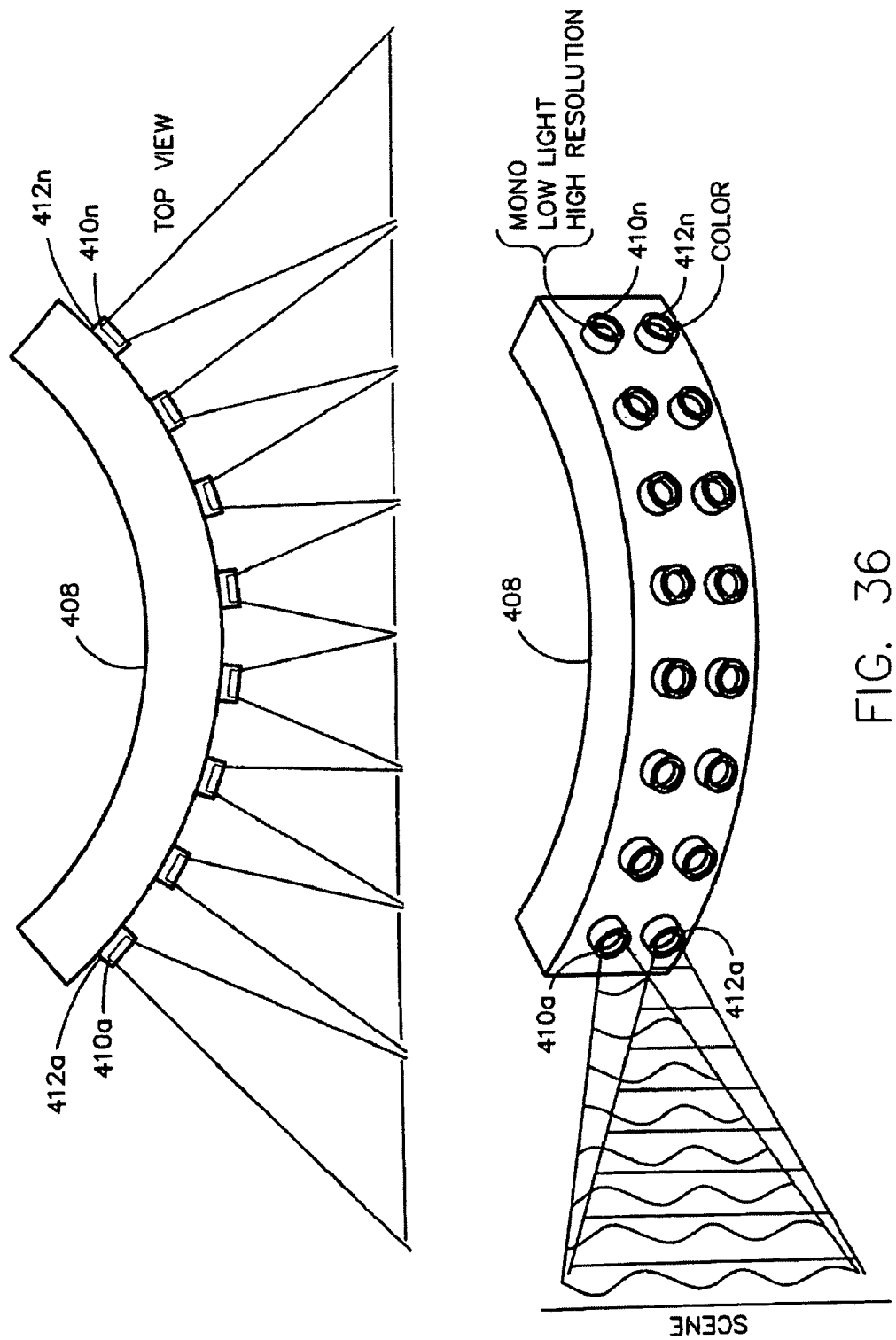

DIGITAL SECURITY MULTIMEDIA SENSOR

CROSS REFERENCE TO RELATED APPLICATION

This application is a continuation of Ser. No. 09/593,361, filed on Jun. 14, 2000 now U.S. Pat. No. 7,023,913 entitled: Digital Security Multimedia Sensor, now allowed.

BACKGROUND OF INVENTION

1. Field of the Invention

The subject invention is generally related to digital cameras and sensors and is specifically directed to a multimedia sensor of use in connection with a digital networked surveillance system. The subject invention in it's preferred embodiment is a networked appliance.

2. Discussion of the Prior Art

Security of public facilities such as schools, banks, airports, arenas and the like is a topic of increasing concern in recent years. Over the past few years, a number of violent incidents including bombings, shootings, arson, and hostage situations have occurred. In addition, agencies responsible for public security in these facilities must cope with more commonplace crimes, such as drug dealing, vandalism, theft and the like.

Such facilities frequently employ monitoring and surveillance systems to enhance security.

This has been common practice for a number of years. Such systems generally have a centralized monitoring console, usually attended by a guard or dispatcher. A variety of sensors are located throughout the facility, such as smoke detectors, fire detectors, motion sensors, glass breakage detectors, badge readers at various access points, and sometimes, video cameras and/or microphones. These prior-art systems often use technologies that are somewhat dated. Sensors are not 'intelligent' in the modern sense; they merely provide an 'ON/OFF' indication to the centralized monitoring system. The sensors are not 'networked' in the modern sense; they are generally hard-wired to the centralized monitoring system via a 'current loop' or similar arrangement, and do not provide situational data other than their ON/OFF status.

Video systems in common use today are particularly dated—they are generally of low quality, using analog signals conveyed over coaxial or, occasionally, twisted-pair cabling to the centralized monitoring facility. Such visual information is generally archived on analog video recorders. Further, such systems generally do not have the ability to 'share' the captured video, and such video is generally viewable only on the system's control console.

Prior art systems have typically employed analog cameras, using composite video at frame rates up to the standard 30 frames/second. Many such systems have been monochrome systems, which are less costly and provide marginally better resolution with slightly greater sensitivity under poor lighting conditions than current analog color systems. Traditional video cameras have used CCD or CMOS area sensors to capture the desired image. The resolution of such cameras is generally limited to the standard CCTV 300-350 lines of resolution, and the standard 480 active scan lines.

Such cameras are deployed around the area to be observed, and are connected to a centralized monitoring/recording system via coaxial cable or, less often, twisted-pair (UTP) wiring. The signals conveyed over such wiring are almost universally analog, composite video. Baseband video signals are generally employed, although some such systems modulate the video signals on to an RF carrier, using either AM or FM techniques. In each case, the video is subject to degradation due to the usual causes—crosstalk in the wiring plant, AC ground noise, interfering carriers, and so on.

More recently, security cameras have employed video compression technology, enabling the individual cameras to be connected to the centralized system via telephone circuits. Due to the bandwidth constraints imposed by the public-switched telephone system, such systems are typically limited to low-resolution images, or to low frame rates, or both.

Prior-art surveillance systems were oriented towards delivering a captured video signal to a centralized monitoring facility or console. In the case of analog composite video signals, these signals were transported as analog signals over coaxial cable or twisted-pair wiring, to the monitoring facility. In other systems, the video signals were compressed down to very low bit rates, suitable for transmission over the public-switched telephone network.

Each of these prior-art systems suffers functional disadvantages. The composite video/coaxial cable approach provides full-motion video but can only convey it to a local monitoring facility. The low-bit rate approach can deliver the video signal to a remote monitoring facility, but only with severely degraded resolution and frame rate. Neither approach has been used to provide access to any available video source from several monitoring stations.

Another commonplace example is the still-image compression commonly used in digital cameras. These compression techniques may require several seconds to compress a captured image, but once done the image has been reduced to a manageably small size, suitable for storage on inexpensive digital media (e.g., floppy disk) or for convenient transmission over an inexpensive network connection (e.g. via the interne over a 28.8 kbit/sec modem).

Prior-art surveillance systems have been oriented towards centralized monitoring of the various cameras. While useful, this approach lacks the functional flexibility possible with more modern networking technologies.

SUMMARY OF THE INVENTION

The subject invention is directed to a fully digital camera system having the capability of providing high resolution still image and/or streaming video signals via a network to a centralized, server supported security and surveillance system. A suitable security and surveillance system and related appliances are shown and described in my copending application entitled: "Multi-media Surveillance and Monitoring System including Network Configuration", filed on even date herewith, and incorporated by reference herein. The digital camera of the subject invention is adapted for collecting an image from one or more image transducers, compressing the image and sending the compressed digital image signal to one or more receiving stations over a digital network.

Recent advances in the art have produced commercially available area sensors with resolutions of 1024×1024, 1280× 1024, 3072×2048, and more. These resolutions are continuing to increase, driven in part by the consumer market for digital cameras. As applied to a security camera, such improved resolution provides a significant improvement in the quality of the captured images. Such improved quality allows greater accuracy in recognizing persons or events.

In addition, visual information captured by these sensors is commonly converted to digital form either on the sensor itself, or by an immediate subsequent analog to digital converter device. In digital form, the captured visual information is largely immune to the degradations that plague the prior-art systems. In addition, such digitized visual information is readily amenable to subsequent processing and networking.

This disclosure describes techniques and systems for applying modem image capture, compression, and networking techniques to a camera used in a security monitoring and surveillance network. The camera described herein may employ a high-resolution imager, a CMOS or CCD area sensor capable of capturing images or video at resolutions much higher than existing CCTV-grade cameras. Such resolution is advantageous when attempting to analyze a situation or when reconstructing an event which has been captured and archived. The camera advantageously converts the captured visual information into digital form. This renders it suitable for further processing and networking without risk of visual degradation often seen in analog systems.

The described camera uses video compression techniques to reduce the amount of image data that must be conveyed by the network. Over recent years, a number of image and video compression techniques have been perfected, which may be advantageously employed to significantly reduce the amount of visual data, while preserving the visual quality.

The camera described herein is designed to transport the captured and compressed visual information over a modem digital network. Modem data networks provide connected devices with high bit rates and low error rates, suitable for the transport of compressed visual data streams.

Modem networks also employ protocols that render such data streams suitable for addressing and routing over interconnected networks. Modem protocols also allow connected devices to send their data to more than one destination address. These techniques, applied to security and monitoring cameras, overcome the limitation of prior-art systems that supported only one monitoring console.

The described camera also employs, or connects to, a variety of sensors other than the traditional image sensor. Sensors for fire, smoke, sound, glass breakage, gunshot detection, motion, panic buttons, and the like, as described in my aforementioned copending application, may be embedded in or connected to the camera. Data captured by these sensors may be digitized, compressed, and networked, as described therein.

The digital camera system of the subject invention generates the image signal by applying a visual image to an imaging device, preferably a CMOS or CCD area sensor. Suitable sensors are available from a variety of manufacturers, in various sizes, resolutions, sensitivities, and image and signal formats. The image, as applied to the sensor, is converted into an electrical signal. Subsequent processing digitizes the video signal for subsequent compression and networking.

Preferably, the camera uses a very-high resolution imager, with resolutions of 1024×1024 or greater. New imager technologies provide resolutions up to approximately 2K×2 k. This represents an improvement over prior-art systems; prior art surveillance networks are limited to typically 300 TV lines of resolution. This improved resolution allows far greater accuracy in recognizing people or in reconstructing events, and can reduce overall system cost by reducing the number of physical cameras required to achieve a given area coverage at a given resolution.

In the described invention, images captured by the area sensor using high-quality, possibly low-loss techniques, such as to preserve image detail. A variety of compression techniques are currently in use. When used with adequate transmission bandwidth, or given adequate compression time, these compression techniques may produce virtually low-loss results. A commonplace example is the DSS broadcast system, which produces broadcast-quality video at bit rates of 1 to 4 Mbits/sec using MPEG-2 compression.

It is an important feature of the invention that a plurality of sensors may be included in a single camera unit, providing array imaging such as full 360 degree panoramic imaging, universal or spherical imaging and wide angle high resolution flat field imaging by stacking or arranging the sensors in an array. The multiple images are then compressed and merged at the camera or image-processing device connected to the network in the desired format to permit transmission of the least amount of data to accomplish the desired image transmission.

The camera may contain a microphone, audio digitizer, and compressor that allow captured audio to be conveyed, over the attached network along with the captured video. Audio and video samples are time-stamped to allow accurate synchronization at the monitoring station(s).

A variety of suitable audio compression methods exist. The captured audio is of sufficient quality that the (attached) monitoring server may, upon analysis, accurately discern sonic patterns indicative of various disturbances such as glass breakage, gunshots, and the like.

As an alternative, acoustic signal analysis may be performed inside the camera by a suitable signal processing system, so as to trigger the camera when a suitable acoustic event is detected.

In the invention, the digitized and compressed audiovisual signals are fed into a digital network, capable of flexible routing and transport of the signals. While the described invention uses Ethernet as a transport medium for the audiovisual signals, any equivalent digital network may be used.

In addition, the communication protocols used by the network and attachments thereunto embed addressing and routing information into the individual signals. This allows the digital information, produced by the attached cameras, to be efficiently routed and disseminated. An example of this protocol is TCP/IP, commonly used in the Internet.

An advantage of such a network and protocol is that the audiovisual signals, produced by the various cameras, may be accessible by any suitable terminal attached to the network. In particular, cameras are accessible by Internet Browsers and search engines. This is an advantageous contrast to the prior art, where the audiovisual signals produced by the cameras were viewable only on a centralized monitoring station.

As a further refinement, enhanced communications protocols may be employed, which provide more efficient transport of real-time asynchronous signals such as the audiovisual signals produced by the various cameras. Protocols such as Real-Time Protocol (RTP), Real Time Control Protocol (RTCP), IP Multicast Protocols, and others, may be used to reduce overall network bandwidth and provide reliable delivery of the audiovisual data to one or more client recipients.

As a further refinement, the digital networking system used may be a wireless network. Such a network would be of advantage in older institutions where the cost of adding network cabling might be prohibitive or hazardous. Wireless networking also allows cameras or monitoring stations to be mobile. A camera might be temporarily installed in some location for special events, without the time and expense of adding network cabling. Or, a facility guard, on foot, may be able to select and view any particular camera during his rounds.

As a further refinement, the various cameras may synchronize themselves to a master clock using a suitable protocol, such as NTP or SNTP. Over a localized network within a facility, camera time bases may thus be synchronized to within 1 to 10 milliseconds of a master clock. This is advantageous during an event reconstruction, where recorded images or videos from the vantage point of different cameras may be compared. Such camera-to-camera synchronization may also be used for accurately measuring time-of-arrival differences between cameras, thereby allowing the location of said event to be calculated using well-known triangulation techniques.

As a further refinement, an internal data storage device such as a small disk drive may be embedded into the camera. This allows the camera to collect images and/or video and audio from cameras, which may be located at some inaccessible distance from the facility's data network. Stored images or video & audio may be later retrieved for analysis or archival, either by removal of the storage media or by transfer of the stored data over the network.

An additional feature of the present invention is the inclusion of additional sensors to detect notable conditions. Examples might include a smoke or fire detector, an alarm pull-handle, a glass breakage detector, a motion detector, and so on. Additionally, the internal microphone and associated signal processing system may be equipped with suitable signal processing algorithms for the purpose of detecting suitable acoustic events. In addition, the camera may be equipped with a pair of externally accessible terminals where an external sensor may be connected. In addition, the camera may be equipped with a short-range receiver that may detect the activation of a wireless 'panic button' carried by facility personnel. This 'panic button' may employ infrared, radio frequency (RF), ultrasonic, or other suitable methods to activate the camera's receiver.

In normal operation, the camera is in two-way communication with a suitable server via the digital network. The camera possesses a unique address and is thus distinguishable from other cameras or attached devices.

During normal times, when the camera is powered-on, it may be triggered by various alarms in order to initiate transmission, or triggered by commands sent by the server. Conversely, it may be pre-programmed to transmit at certain times or intervals. Both still and motion video may be transmitted alternately or simultaneously. An onboard archival system may be included to permit temporary storage of data prior to transmission, permitting transmission of pre-event data. The onboard archival system also permits internal storage of images or video at a different resolution than that which is transmitted over the network. This allows pre- and post-event analysis of video at higher resolutions than that transmitted. The on-board storage also allows the device to store data during times where a network connection is absent or intermittent.

Where desired, a local illumination system may be incorporated in the camera for low ambient lighting conditions. This may be infrared, if desired. As described in my aforementioned copending application, various other sensor appliances such as acoustic detectors, motion sensors and the like may activate the camera. These adjunct sensors may be used to trigger the on-board illumination, or the illumination may be on at all times. In addition, the camera and/or lighting can be controlled by manual or automated commands from the server or a workstation on the network.

Various geometries or configurations may be incorporated in the camera design. Specifically, the capability for placing multiple sensors in a single enclosure or unit greatly increases the resolution and/or viewing range of the camera without duplicating the per unit cost associated with prior art cameras by permitting all of the sensors to communicate directly to a single processor, compressor, transmitter circuit. Also, the higher-resolution of this multi-sensor camera can eliminate the need for expensive pan/tilt/zoom mechanisms. It also allows the periodic capture of a wide-field high-resolution view that is not possible with conventional CCTV cameras. In addition, other configurations which can be combined in a single or multiple sensor array are pan, tilt, rotate and zoom features, a single backup power supply for multiple sensor units and the like. The camera can be adapted for wireless communication and can be portable where desired.

It is, therefore, an object and feature of the subject invention to provide a high resolution digital camera for providing both high resolution still and streaming video images in a digital format.

It is another object and feature of the subject invention to provide a digital camera having a plurality of image sensors positioned to provide a predetermined viewing pattern of an area greater than the area of a single sensor, wherein the multiple images may be merged, compressed and transmitted as a single image data signal.

It is an additional object and feature of the subject invention to provide a digital camera that is capable of converting an analog image signal to a digital signal for compression and transmission.

It is another object and feature of the subject invention to provide a digital camera adapted for being incorporated in a multimedia sensor system, wherein other sensors activate the camera for initiation of transmission.

It is yet another object and feature of the subject invention to provide for a digital camera that is suitable for connection to a server supported network wherein the camera may communicate with the server for sending image signals and the server can communicate various control, command and updating signals to the camera.

It is a further object and feature of the subject invention to provide onboard storage capability 30 for storing image data at the camera for recall when transmission is activated.

Other objects and features of the invention will be readily apparent from the drawings and the following detailed description of the preferred embodiments.

BRIEF DESCRIPTION OF THE DRAWINGS

FIG. 4*a* is a front view of a panel camera configuration.

FIG. 4*b* is a top view of the camera of FIG. 4.

FIGS. 8*a*, 8*b* and 8*c* illustrate circuit flow diagrams for various implementation schemes.

FIG. 5.

FIGS. 21a, 21b, 21c and 21d are perspective views of various installations of a panoramic camera system.

FIG. 36 depicts a like array in a semicircular housing.

DETAILED DESCRIPTION OF THE PREFERRED EMBODIMENTS

Figure 1:
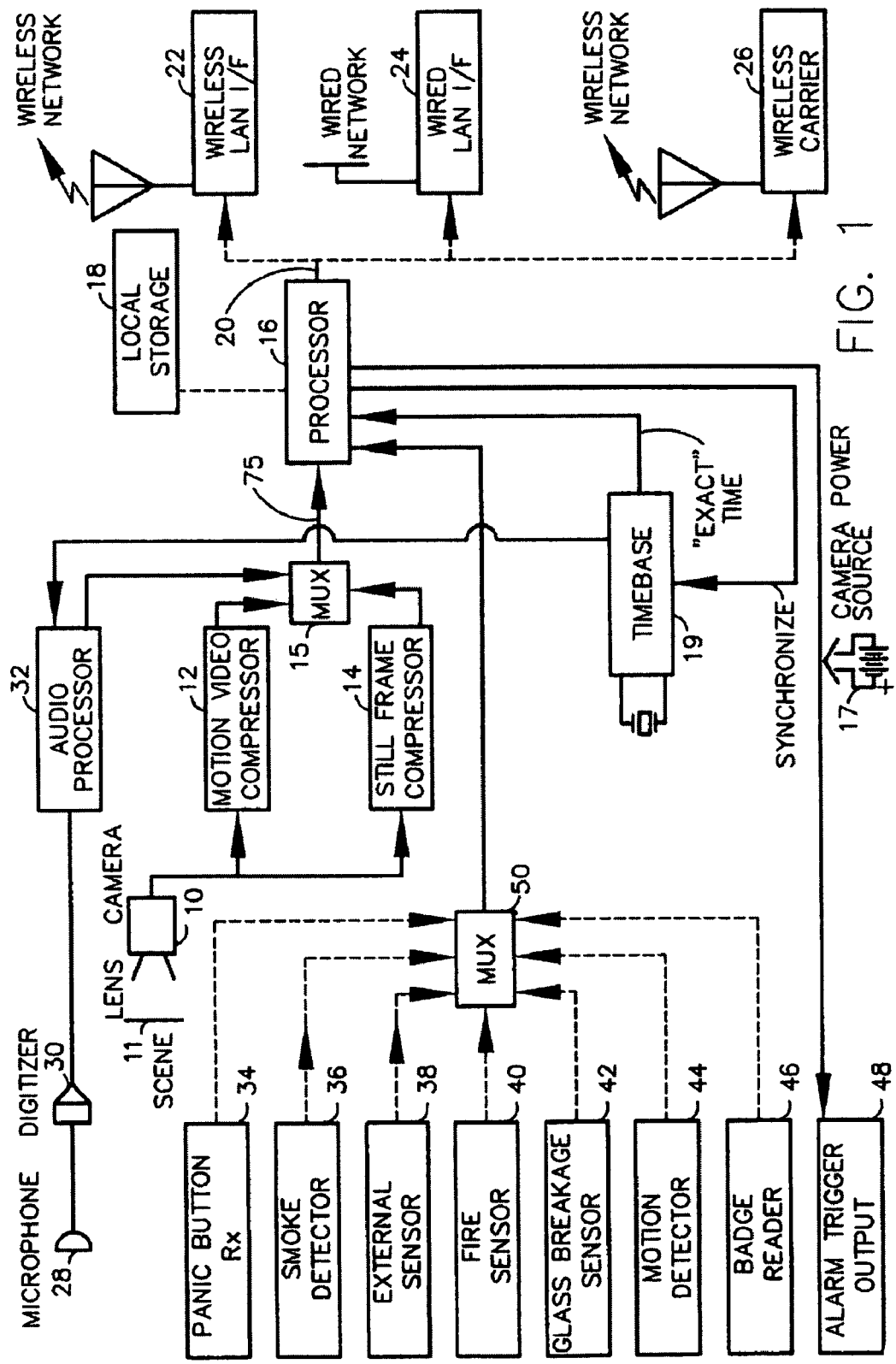
FIG. 1 is an overall system configuration diagram of a multimedia sensor in accordance with the subject invention.

With specific reference to FIG. 1, an overall system configuration for the camera includes a lens and image sensor 10 for capturing a scene 11 within the range of the sensor. The sensor generates a digital signal of the scene, which is then transmitted to a motion video compressor 12 and/or a still frame compressor 14. The compressed signal is then output to a processor 16. Where both still and motion are captured, a multiplexer 15 is provided for merging the signals in advance of the processor. Local storage 18 is provided for storing the image signal prior to transmission when the transmitting signal is not activated. This permits data to be archived, allowing both pre-event and event data to be transmitted when the camera is activated to the transmitting mode. Local storage 18 can also be used for primary storage if no network is available, or if there no network available. It may also be used to archive data at another resolution than that which is being delivered over the network. The output signal from the camera circuitry is output on line 20 to any of a variety of carrier systems such as a wireless LAN (WLAN) via the WLAN interface and transceiver 22, and/or a wired or cabled LAN interface 24, and/or other wireless carrier systems such as CDPD, CDMA, and the like, as indicated at interface 26. The camera derives operating power from power source 17, which may be an AC operated DC power supply and may additionally be backed-up by local batteries.

It should be noted that the sensor 10 could be either an analog camera system in combination with an analog-to-digital converter or a digital camera imager which employs an integral analog-to digital converter. Where greater resolution is desired, direct digital imaging is the preferred mechanism. A variety of high-resolution digital imagers are currently available, such as the VCA1280C from Symagery Microsystems, or the PCS2112 from Pixelcam Inc.

As shown in FIG. 1, the local camera processor 16 may also be utilized to incorporate various sensor systems into the camera unit. For example, a microphone 28, digitizer 30 and audio processor 32 provide audio/acoustical data collection and transmission. The audio signal thus generated may also be used as a triggering event for activating the camera system into a transmission mode and/or alerting a server or monitoring station. Other sensors may be incorporated as well including a panic button or other manually activated trigger 34, a smoke detector 36, various external sensors 38, a fire detector 40, a glass breakage detector 42, a motion detector 44, a badge reader 46 and the like. Where multiple multimedia sensors are incorporated into the camera system a multiplexer 50 is desirable in advance of the processor 16 for merging the various data signals. Any one or combination of sensors may be utilized a triggering event for activating the camera into the transmission mode. An alarm output 48 may also be provided, in the form of a contact closure or opto-isolated switch controlled by the processor 16.

The configuration of the system of FIG. 1 permits the monitored scene 11 to be captured utilizing a high-resolution imager in the form of the sensor 10. The digital visual information data is compressed in still frame format and passed via the system processor to the network interface of choice. Simultaneously, ambient audio is captured, digitized, compressed and multiplexed into the information stream being sent to the network. Upon detection of a trigger event, the system additionally captures, compresses and sends to the network compressed motion video information and a time stamp which indicates the exact time the trigger event occurred. If a real-time connection to a network is not desired or possible, the visual, audio and alarm information may be stored on a local storage device, such as a disk drive, for later retrieval and analysis.

As depicted in FIG. 1, the camera's internal timebase 19 may be synchronized to an external timebase, allowing accurate timestamping of captured events, alarms, images, video and audio. Such timestamping is also useful for temporal correlation of archived events, as stored in the local storage 18 or on a network-based server. Conventional time synchronization protocols such as NTP may be used.

Figure 2:
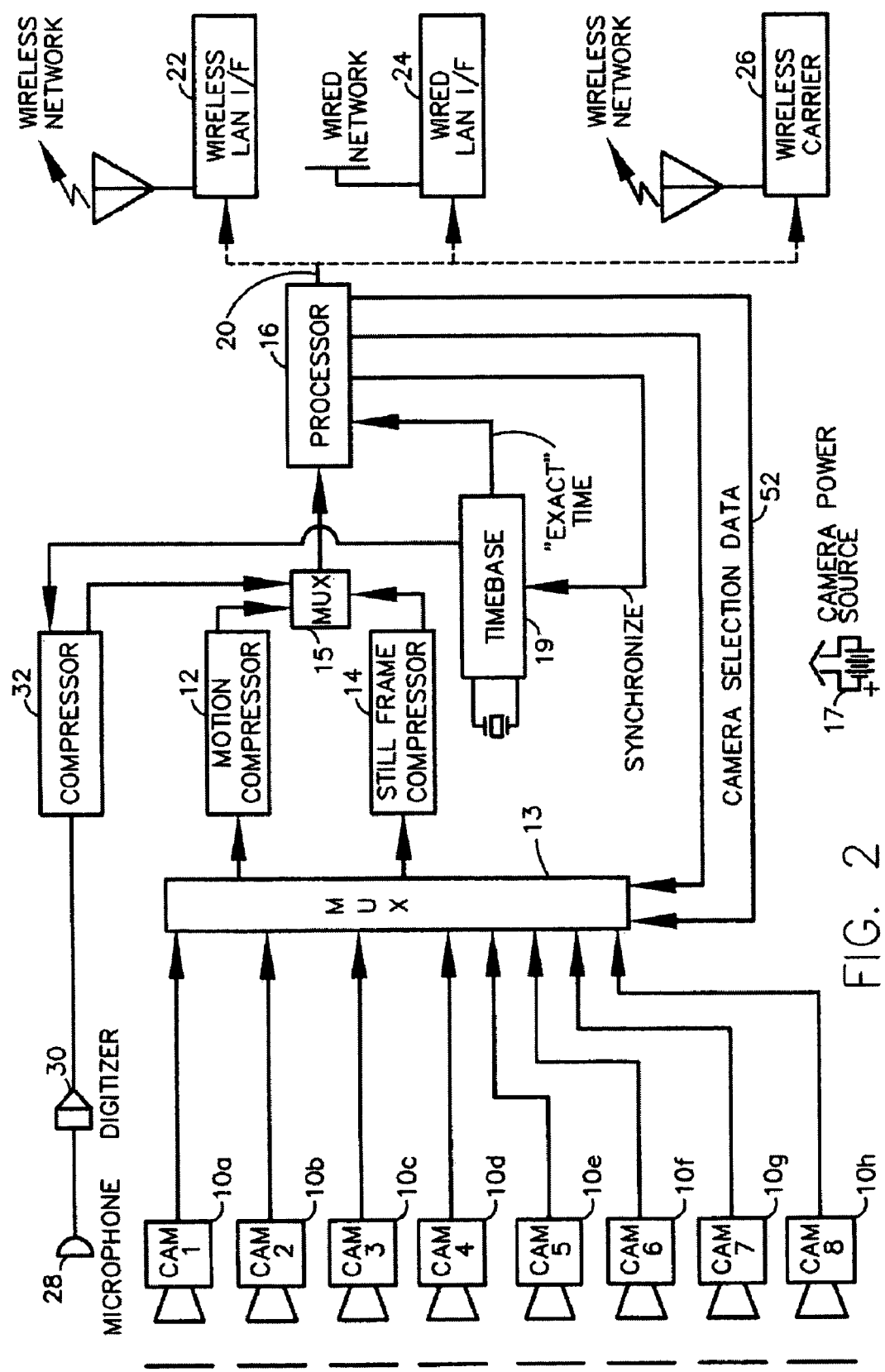
FIG. 2 is a camera in accordance with the diagram of FIG. 1 utilizing multiple sensors to provide an enhanced, enlarged image capture field with a single camera unit.

Turning now to FIG. 2, it is an important feature of the subject invention that a plurality of image sensor units 10a-10h (for example) may be incorporated in a single camera unit. In this multiple sensor version, the plurality of sensors 10a-10h are connected to a video multiplexer 13. The sensors are physically arranged to view adjacent or different but overlapping segments of a desired scene. Selection of a desired sensor is controlled by the control signal 52 to the multiplexer 15 and is made by the camera processor 16 in response to a sensor (triggering) input, or may be made by a server, on the attached network, in response to trigger inputs or other appropriate stimuli. In the absence of trigger inputs, the cameras may be selected sequentially according to some predetermined pattern, or manually accessed. All of the various auxiliary sensor systems shown in FIG. 1 may also be incorporated in the multiple sensor system of FIG. 2. As in FIG. 1, an AC operated power supply 17 is employed, with internal battery back-up as necessary. It should be noted that one automatic triggering event would be loss of power or loss of connectivity of any sensor or the entire unit to the network. In this event the camera would immediately start storing on the local memory unit.

Figure 3B:
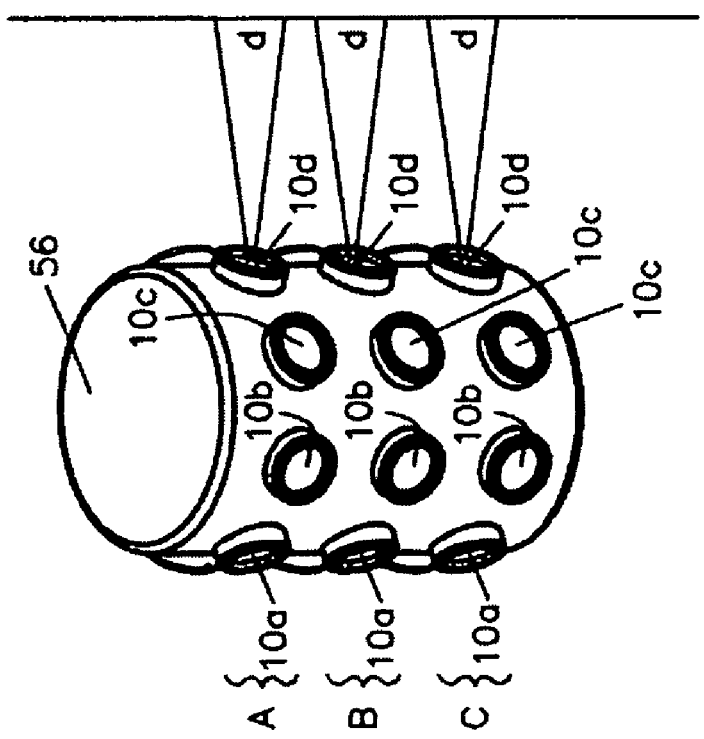
FIG. 3*b* is a perspective view of a stacked array panoramic camera in accordance with the subject invention.
Figure 3A:
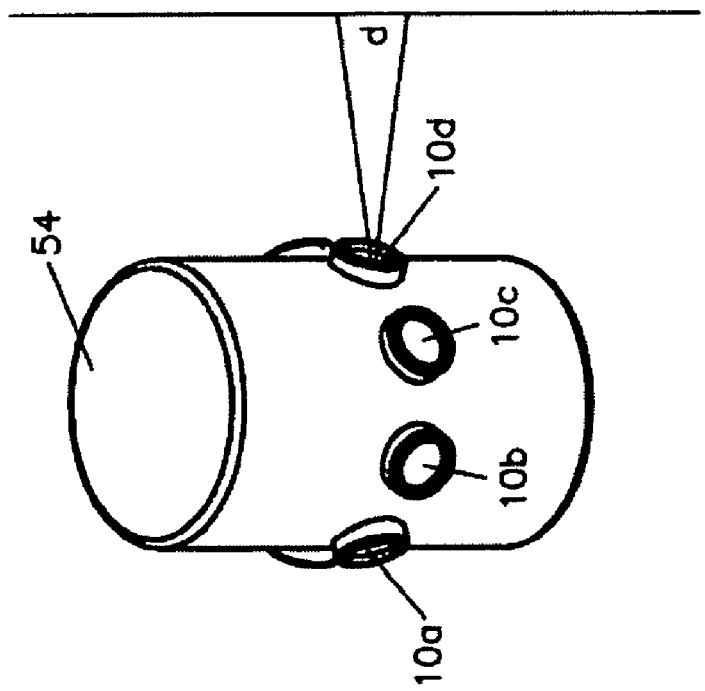
FIG. 3*a* is a perspective view of a panoramic camera in accordance with the subject invention.

FIGS. 3a and 3b are perspective views of a 360-degree single row and multiple row multiple sensor camera unit, respectively. These show the physical arrangement of two panoramic multiple-sensor camera systems. In FIG. 3a, a single-row camera 54 is depicted, in this case housing eight equally angularly spaced, radially aimed sensors 10a-10d (visible) and 10e-10h (not visible). Appropriate lenses are selected to provide each sensor with a field of view of 45 degrees or more, thus providing adjacent or overlapping coverage of an entire 360-degree panorama. In FIG. 3b, the camera is enhanced by providing multiple rows of sensors in one housing, again with overlapping fields of view. Each row A, B, and C includes eight angularly displaced sensors with 10a-10d sensors of each row being visible and sensors 10e-10h of each row being hidden from view. In either case, the field of view, camera resolution, and distance to the farthest target are adjusted to provide image resolution sufficient for recognition of people, events, or for event reconstruction. The views are adjacent or even overlapping in order to provide a full panoramic view of the desired scene to be monitored. Asymmetric lenses may be employed to modify the geometry of the rendered scene or to provide an appropriate field of view. This may be necessary when, for example, one of the sensor units 10a-10h may be viewing a scene at an angle to the camera, such as the corner of a room.

Figure 5:
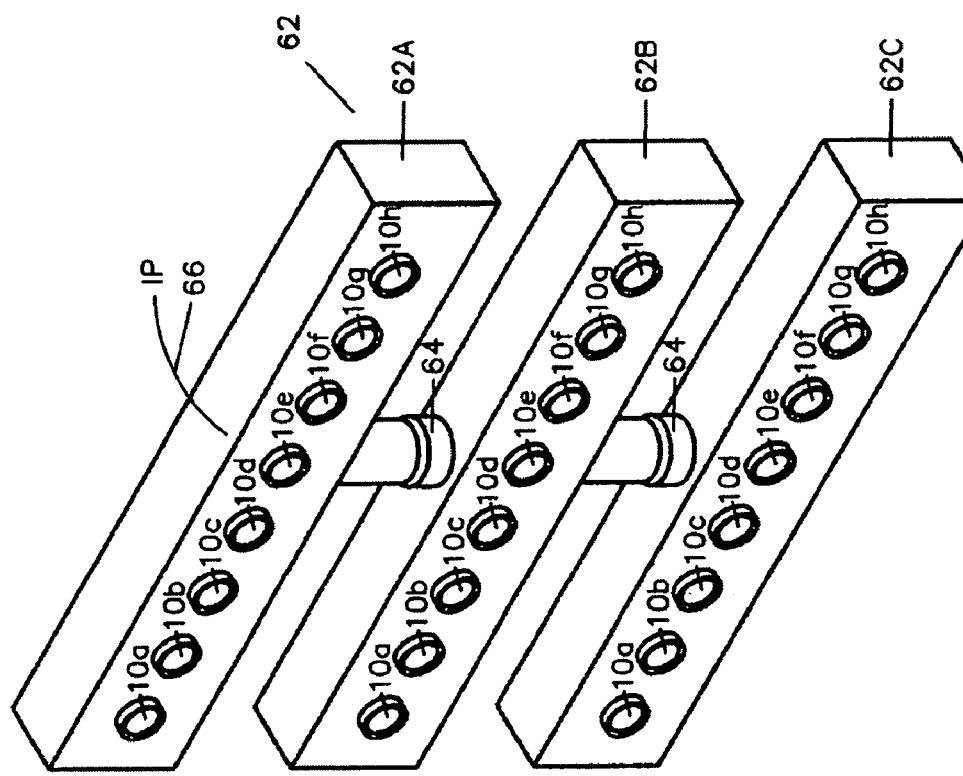
FIG. 5 is a panel camera configuration comprising a plurality of single row units coupled in a stacked relationship.

FIGS. 4a and 4b are the front and top views of a multiple sensor array camera 58 in a row or panel configuration. In this configuration, the single row has four sensors 10a-10d to provide for a wide angle viewing capability. As shown in FIGS. 4a and b, the panel camera 60 includes multiple rows A, B, C, D, each with a plurality of sensors 10a-10d to further enlarge the viewing area of the single camera unit. FIG. 5 is an illustration of a "stacked" panel camera 62 comprising a master camera module 62A coupled to a plurality of slave cameras 62B and 62C via a coupler 64. Master camera 62A includes the network connector 66 and the two slave cameras 62B and 62C are stripped units feeding into the processor and processing circuitry (see FIG. 1) of the Master camera 62A. Each of the master and slave cameras has a plurality of sensor units 10a-10h, as described in accordance with the illustration of FIG. 4a.

Figure 6:
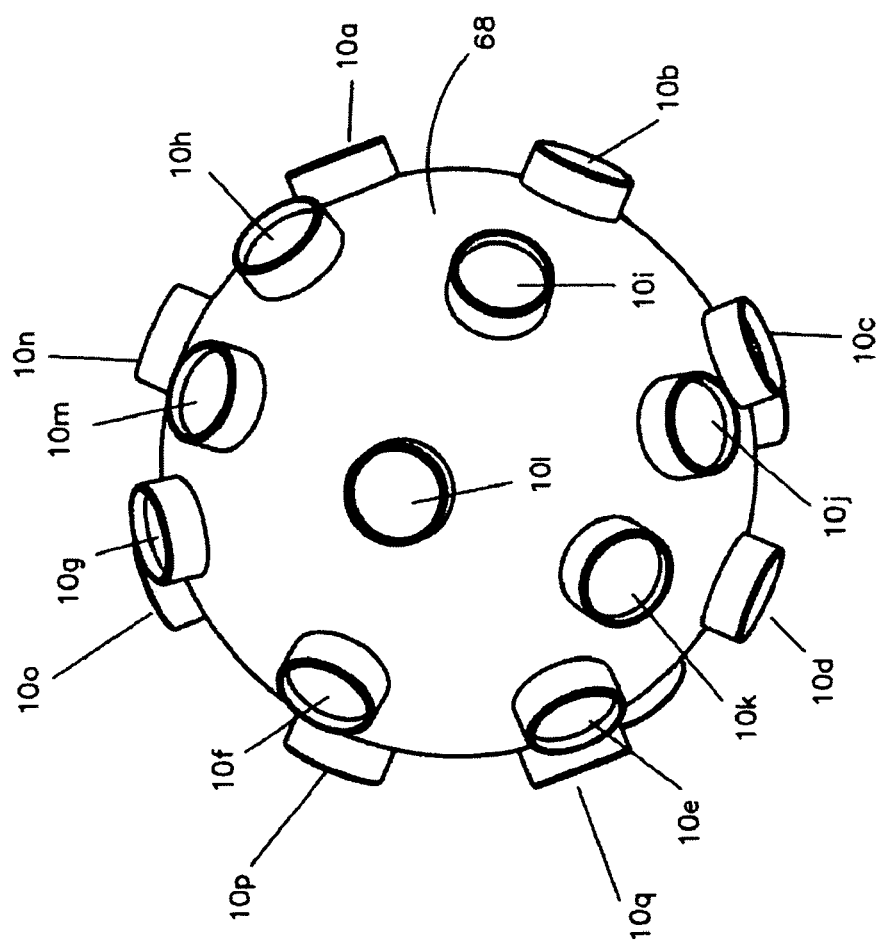
FIG. 6 is a view of a spherical camera configuration.

FIG. 6 is an illustration of a spherical camera configuration with the spherical camera housing 68 with a plurality of angularly spaced sensors 10a-10n for providing universal coverage of any given space of volume.

Figure 7:
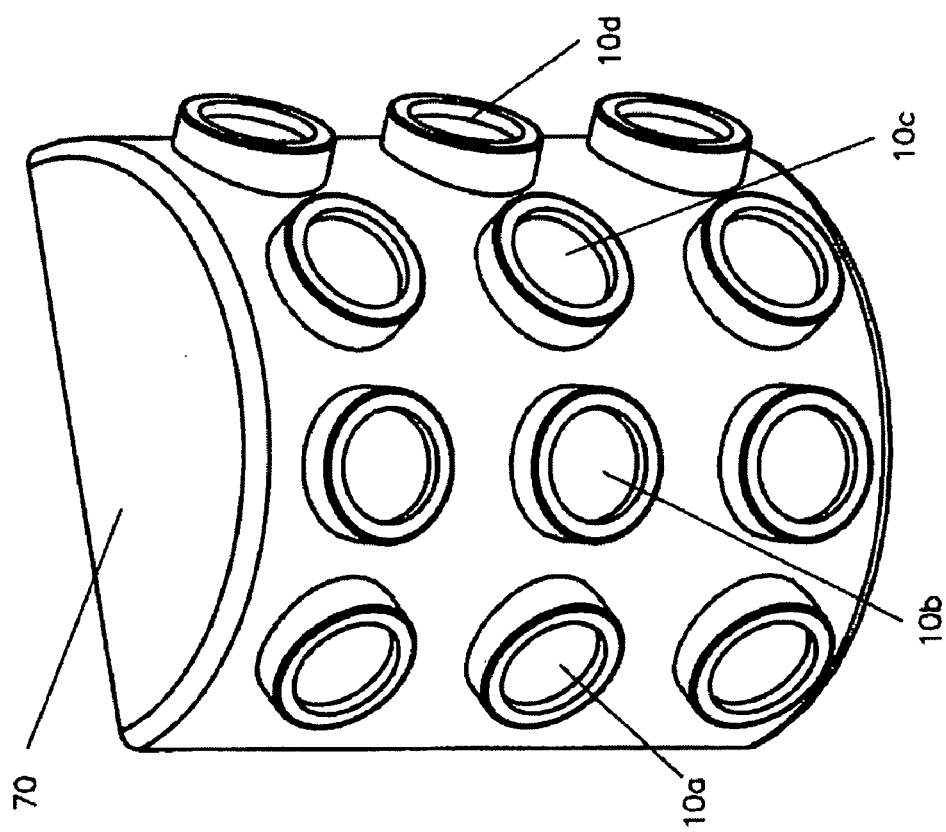
FIG. 7 is a view of a modified, partial span panoramic camera configuration.

FIG. 7 is an illustration of a semi-panoramic camera 70, ideally suited for mounting on a flat wall and having a plurality of angularly spaced, radially projecting sensors 10a-10d.

Various implementation schemes for the sensor system are shown in FIGS. 8a, 8b and 8c. In FIG. 8a, the sensor 10 is connected to an MPEG encoder chip 72 for producing video or still digital data signals on line 74. Suitable encoders may be, for example, a Sony CXD1922Q, iCompression iTVC12, or Philips SAA675011. In FIG. 8b, the sensor 10 is connected to an MPEG chip 72 and, in parallel, to a still buffer 74 that is connected to the DSP 76. The DSP chip 76, such as a Texas Instruments TMS320C202, may be programmed to perform a JPEG compression of the received image. The MPEG chip output 73 and the DSP output 77 are introduced into a multiplexer 78 for merging the still and video data, which is then output as a digital signal on line 74. In FIG. 8c, the sensor 10 is connected to a decimator 80 placed in advance of the MPEG chip 72 to reduce the effective resolution of the image as fed to the MPEG chip, as may be required for network load management or for compatibility with the particular MPEG chip used. The remainder of FIG. 8c is identical to FIG. 8b. Note that FIGS. 8b and 8c allow the simultaneous capture and compression of motion video and still-frame images. Given this configuration, the camera may, for example, capture and compress high-resolution still images from a large megapixel sensor, while simultaneously decimating and compressing motion video at a lower resolution. For example, the camera may be simultaneously storing and/or transmitting still images of 1280×1024 resolution and moving images of 720× 480 or less resolution.

Figure 9:
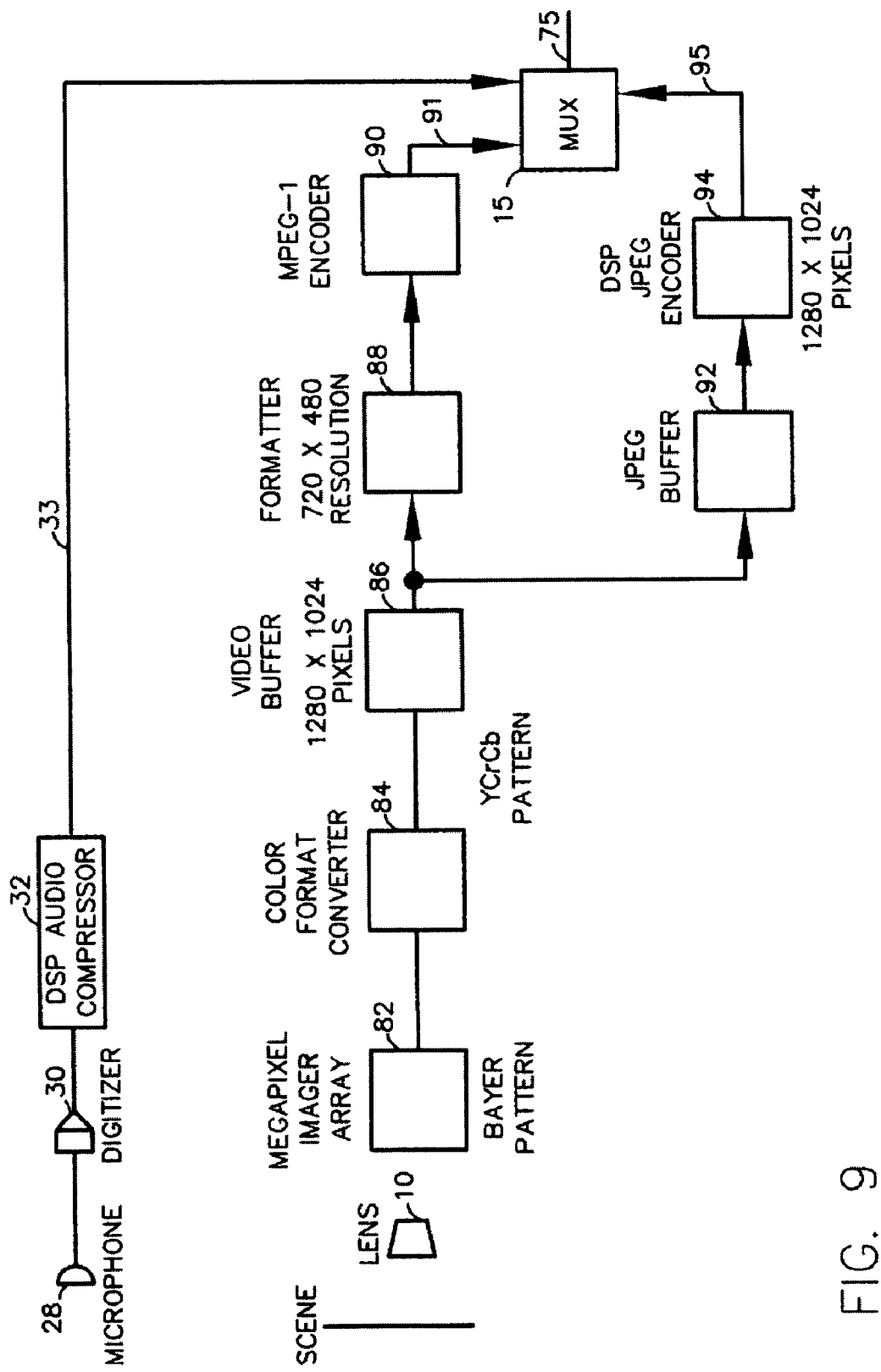
FIG. 9 is an illustration of one embodiment of the implementation schemes of FIG. 8.

A block circuit diagram of a useful configuration is shown in FIG. 9 and is in accordance with the teachings illustrated in FIG. 1. The microphone 28 is connected to a digitizer 30 for providing a digitized raw audio signal to the DSP audio compressor 32 for providing a digital audio signal on line 33 as one input to the multiplexer. The sensor 10 provides a scene signal to the megapixel imager array 82, which may be formatted as a Bayer pattern, YCrCb, or other suitable color pattern. The output of the array is introduced into a color format converter 84. The output from the color format converter is introduced into a 1280×1024 video buffer 86 for producing a signal that is then introduced, in parallel, to the 720×480 resolution formatter 88 for streaming video and into the JPEG buffer 92 for stills. The output of the JPEG buffer 92 is introduced into the 1280×1024 DSP JPEG encoder for producing a signal represent high resolution stills. The video output on line 91 and the still output on line 95 form other inputs to the multiplexer 15. The multiplexer output on line 75 is the merged signal that is introduced into the camera processor 16, see FIG. 1.

Figure 10A:
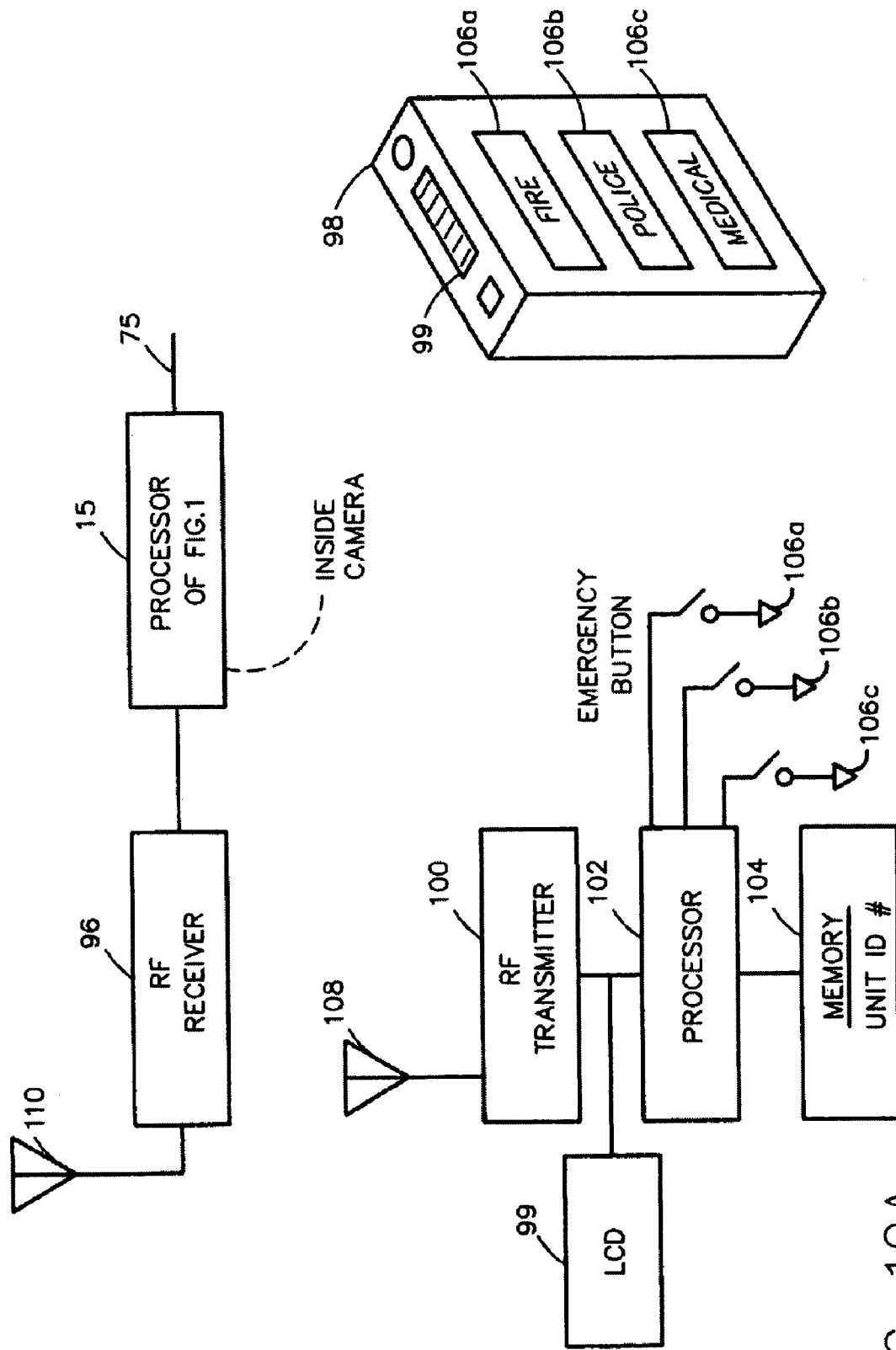
FIG. 10 is an illustration of a wireless receiver and portable transmitter for use in combination with the camera system in accordance with the subject invention.
Figure 10B:
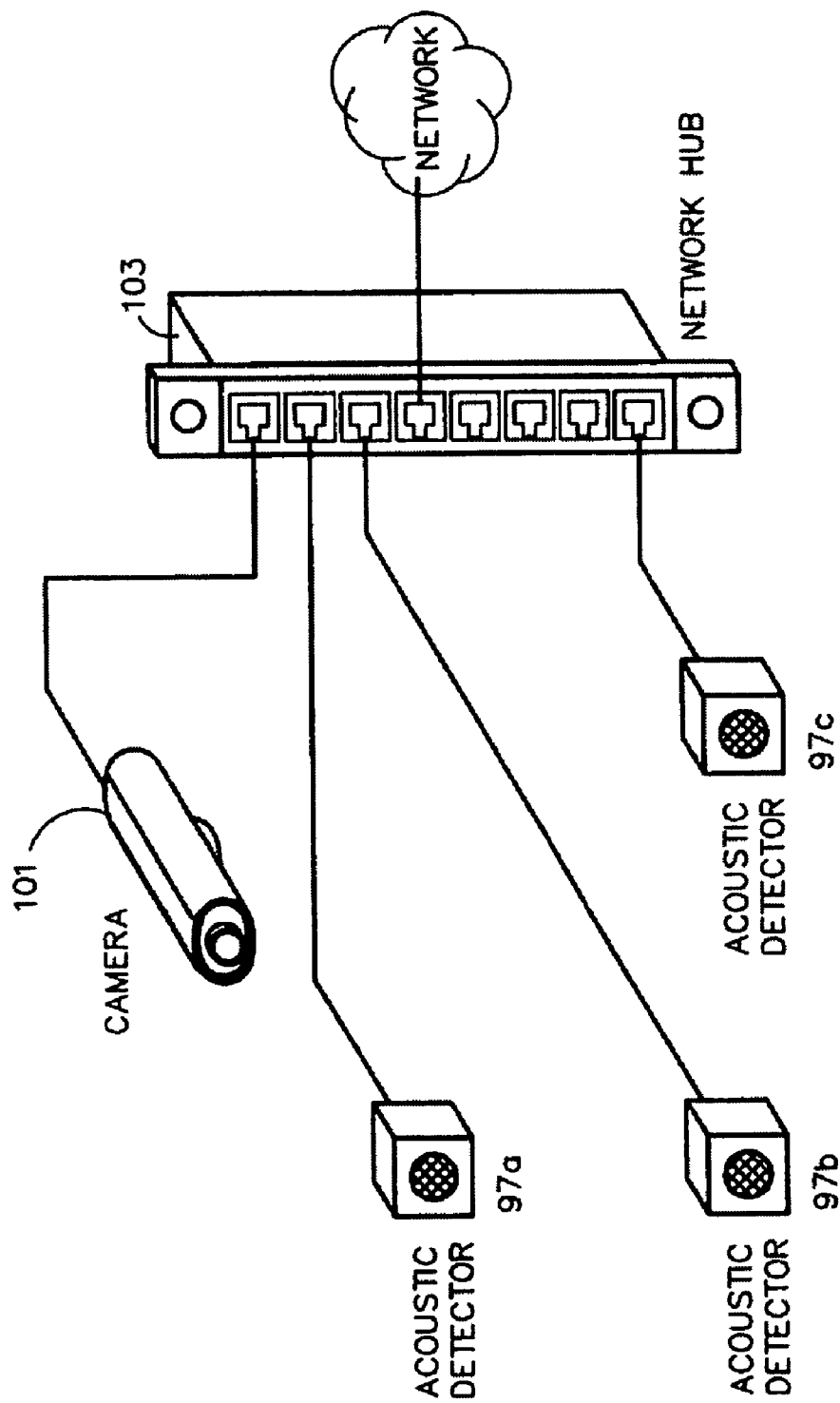

The various sensors and triggering units associated with the camera are not required to be physically located on one camera unit. As shown in FIG. 10A, one of the inputs to the processor (see also FIG. 1) can be the output generated by, for example, an RF receiver 96. This permits a roving or remote wireless unit such as the handheld panic button unit 98 to communicate with the camera for generating an activation trigger and/or for communicating with the network. The remote unit 98 includes an RF transmitter 100, a processor 102 and may include a memory 104 for storing information such as unit ID and the like. When one of the panic buttons 106a, 106b and 106c is depressed to close the circuit and send input to the processor 102, an output signal is transmitted via the RF transmitter 100 and the antenna 108 to the RF receiver 96 via antenna 110, for processing by the camera unit processor 15. In an alternative embodiment, an LCD screen 99 may be included in the remote unit for displaying various instructions and data. In this case, both the receiver 96 and the transmitter 100 would be replaced by two-way transceivers.

Figure 11A:
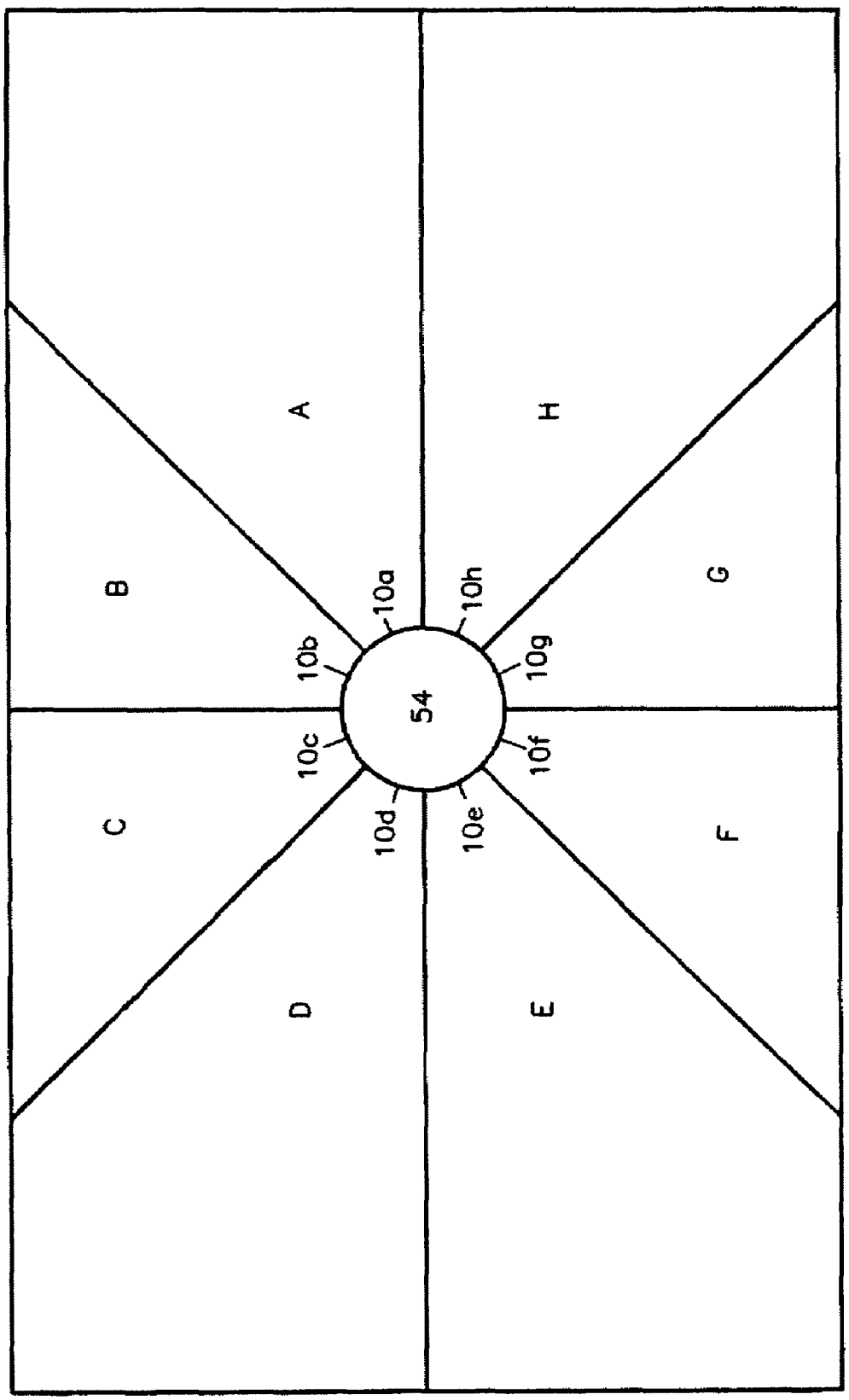
FIGS. 11*a* and 11*b* illustrate installation architectures utilizing the panoramic camera system.
Figure 11B:
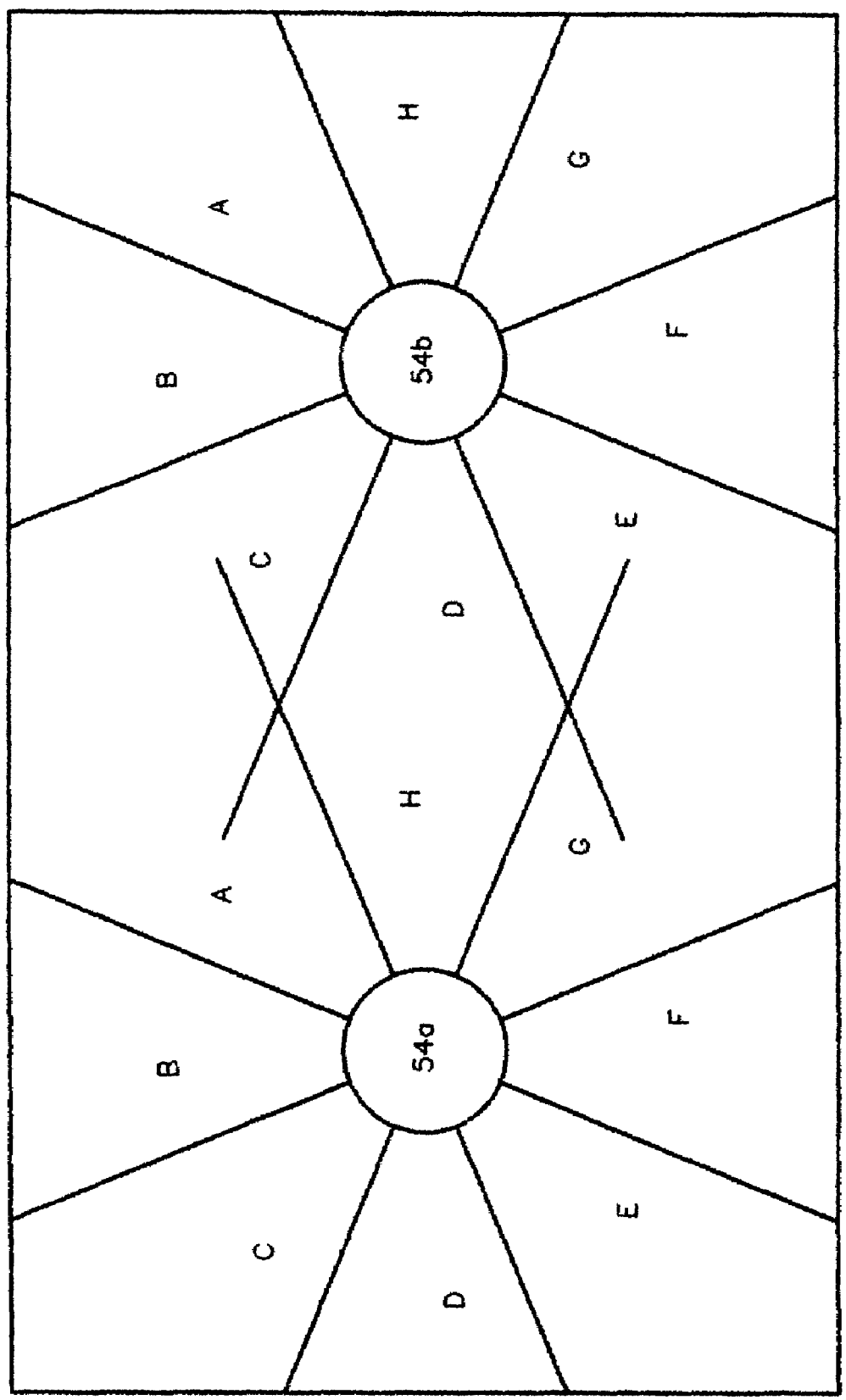

FIGS. 11a and 11b illustrate example installation architectures utilizing the panoramic camera configuration of FIG. 3a or FIG. 3b. As shown in FIG. 11a, a single panoramic camera 54 may be placed near the center of room or area to be monitored. Each sensor 10a-10h covers a specific triangular zone of the room A-H, respectively. In a larger area or room as shown in FIG. 11b, multiple panoramic cameras 54a and 54b may be utilized to assure of the proper level of resolution at distances within the range of each sensor. As there shown, the two cameras 54a and 54b are positioned such that the maximum range covered by each camera is within satisfactory limits.

Where zones overlap, the processor 15 (see FIG. 2) or a centrally disposed server is utilized to merge and crop the various camera signals to provide a continuous, smooth panoramic image. This may be accomplished by offsetting the horizontal and vertical pixel counters, which drive the image sensor column and row addresses.

Figure 12A:
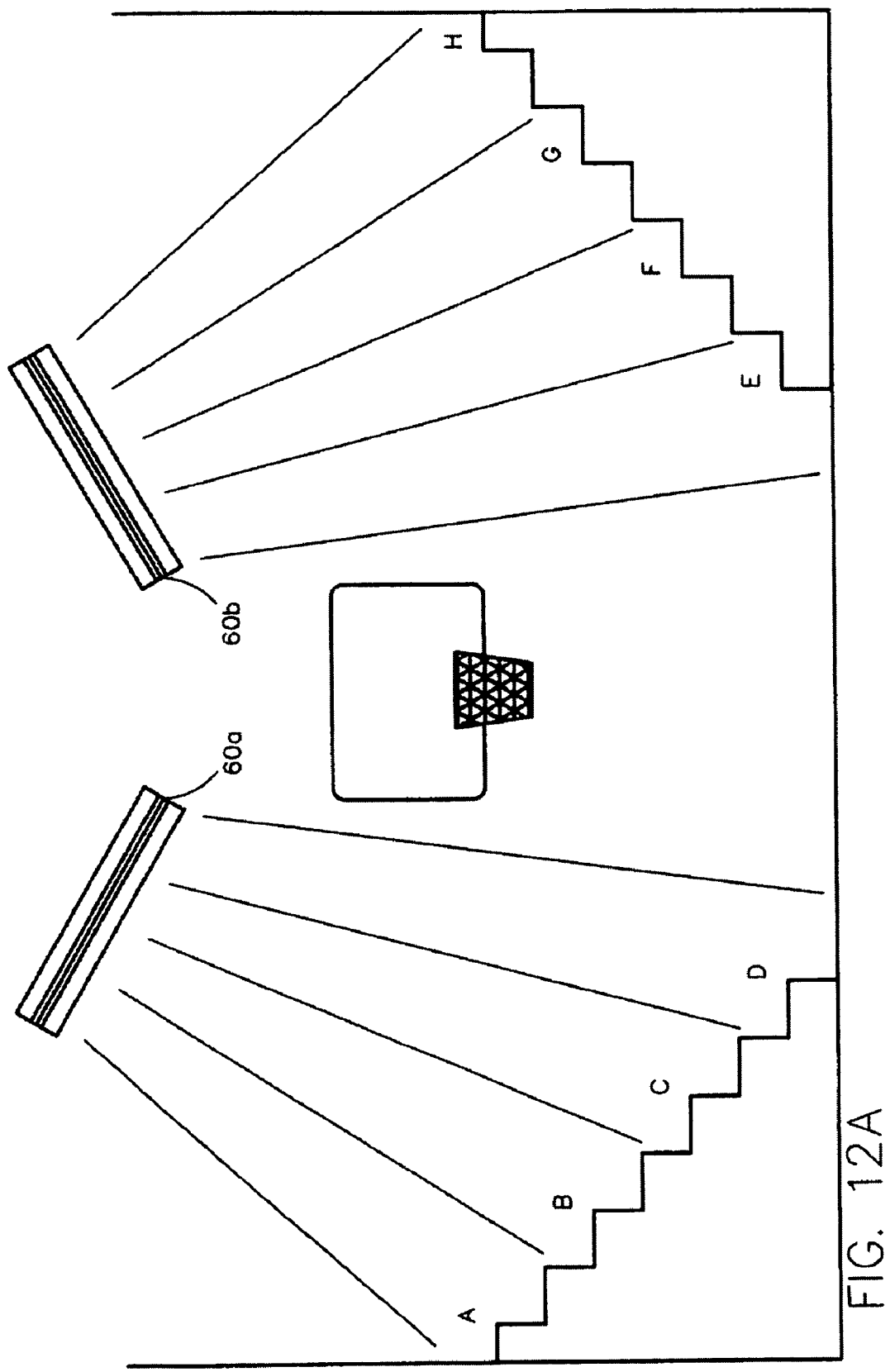
FIGS. 12a and 12b illustrate installation architectures utilizing the panel camera system.
Figure 12B:
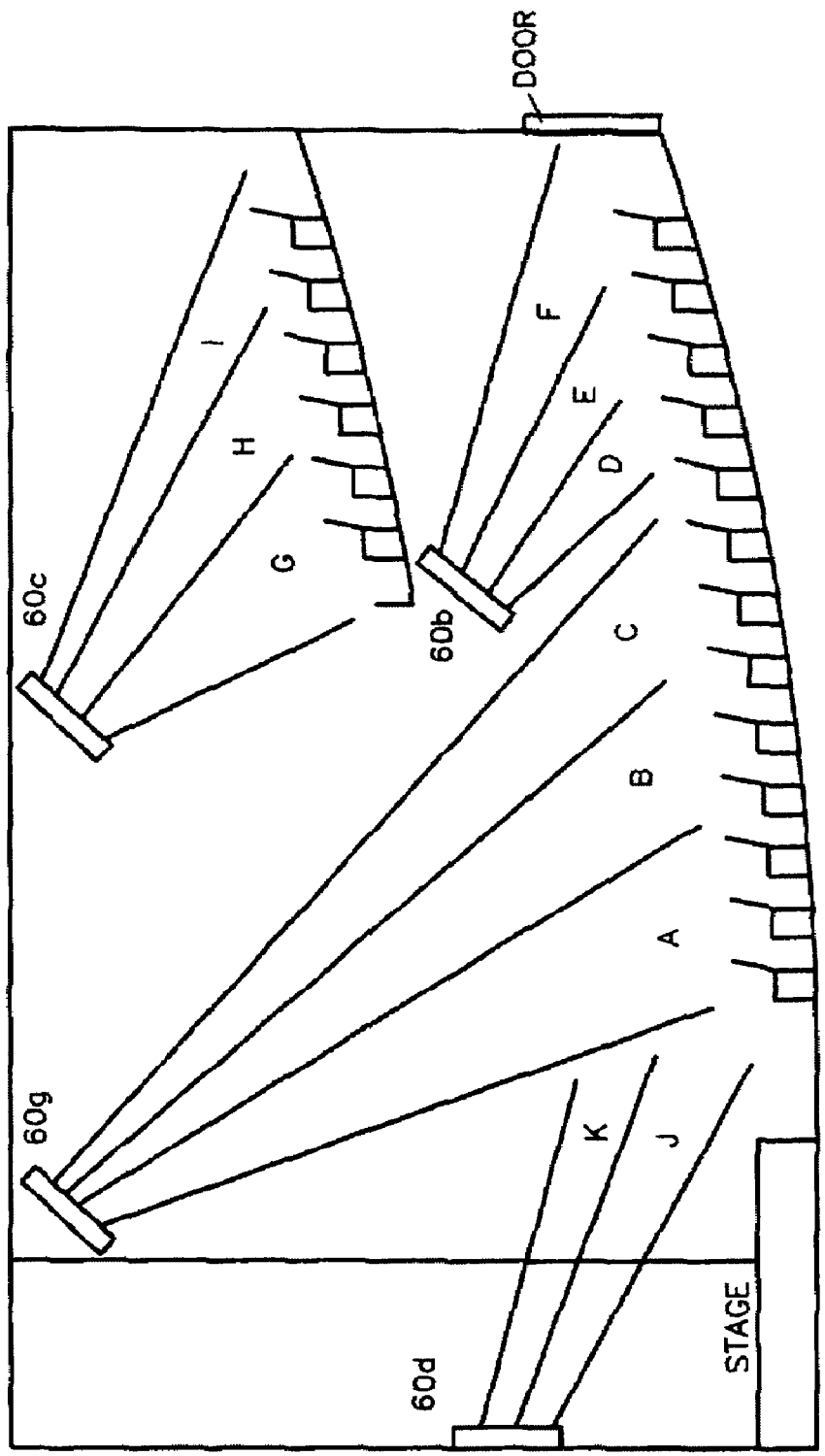

The panel camera configurations of FIGS. 4a, 4b, and 5 are useful for covering specific zones in large areas, as is shown in FIGS. 12a and 12b. As shown in FIG. 12a, when it is desirable to monitor a large space such as the seating area of an arena or the like, the stacked panel cameras 60a and 60b, as shown in FIG. 5 may be utilized and positioned to cover all of the zones A-H of a seating area. Of course, rows of multiple lenses would be utilized to cover the entire area. This configuration is also useful in tiered seating such as that shown in FIG. 12b with panel cameras 60a, 60b, 60c, and 60d each covering specific zones A-K, as shown.

Figure 13:
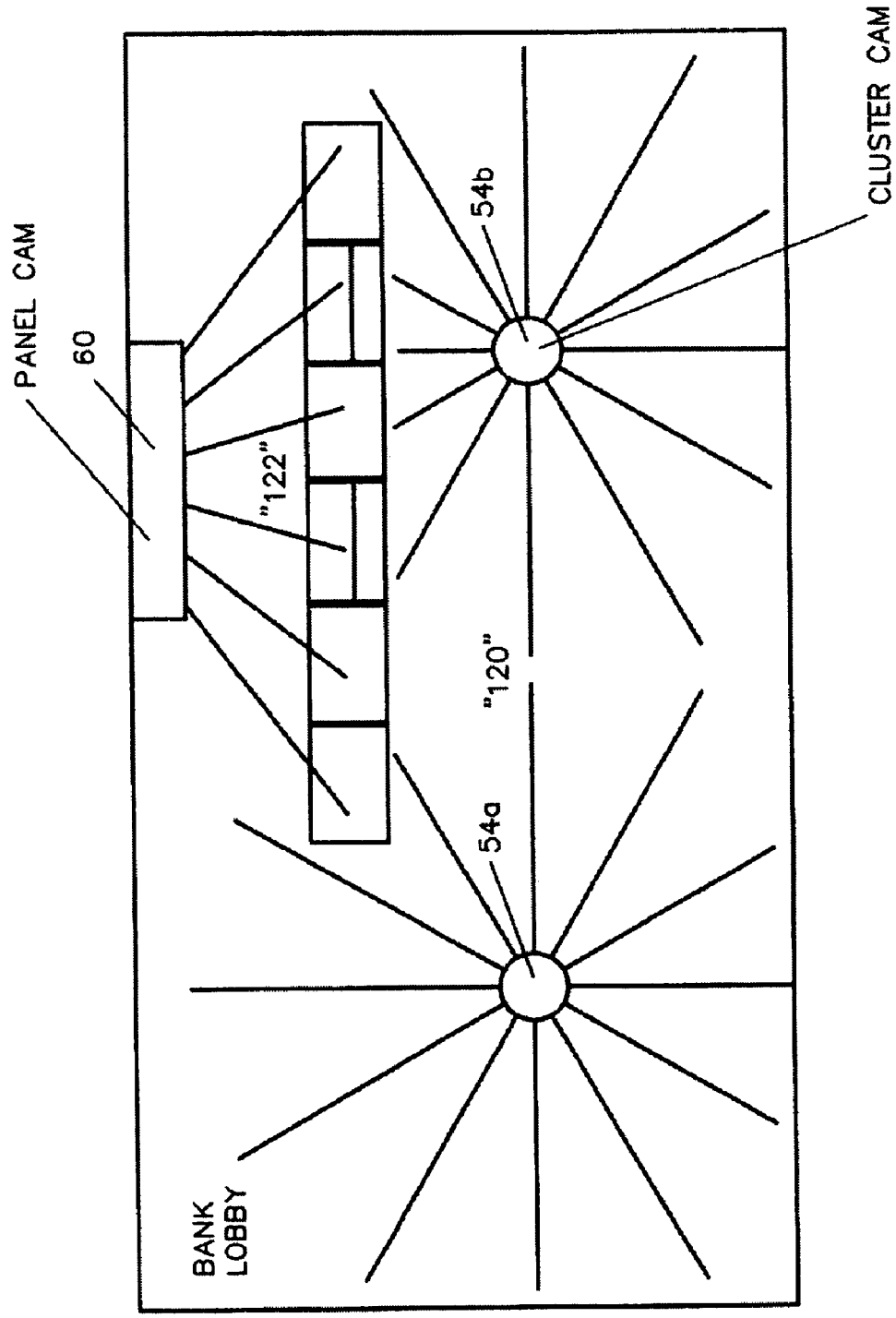
FIG. 13 illustrates an installation architecture utilizing a combination of panel cameras and panoramic cameras.

FIG. 13 is an illustration of an installation architecture combining both the panel camera and the panoramic camera configuration for a typical bank lobby, wherein the common lobby area 120 is monitored by two strategically located panoramic cameras 54a and 54b and the teller area 122 is monitored by a panel camera 60.

Figure 14:
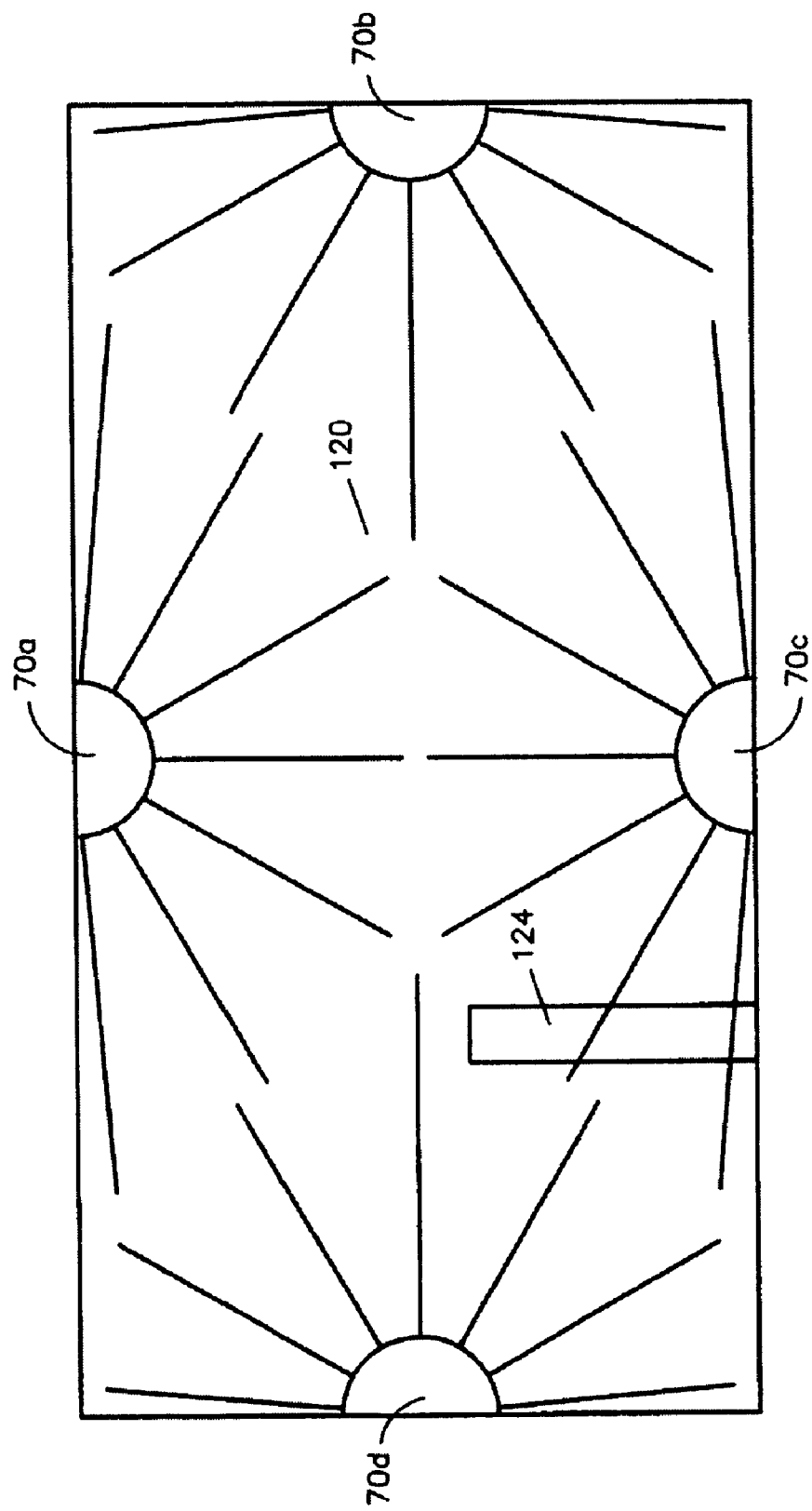
FIG. 14 illustrates an installation architecture utilizing a plurality of partial span panoramic 25 cameras.

FIG. 14 is an illustration of an installation architecture using the partial panoramic camera or wall mount camera 70 as shown in FIG. 7. This camera is particularly useful in large rooms where a single panoramic camera will not give adequate coverage and where multiple panoramic cameras may not be functional because of obstructions to the field of vision such as, by way of example, the partial partition 124. As can be seen, the overlapping zones of these cameras provide full coverage even with the obstructed view.

Figure 15:
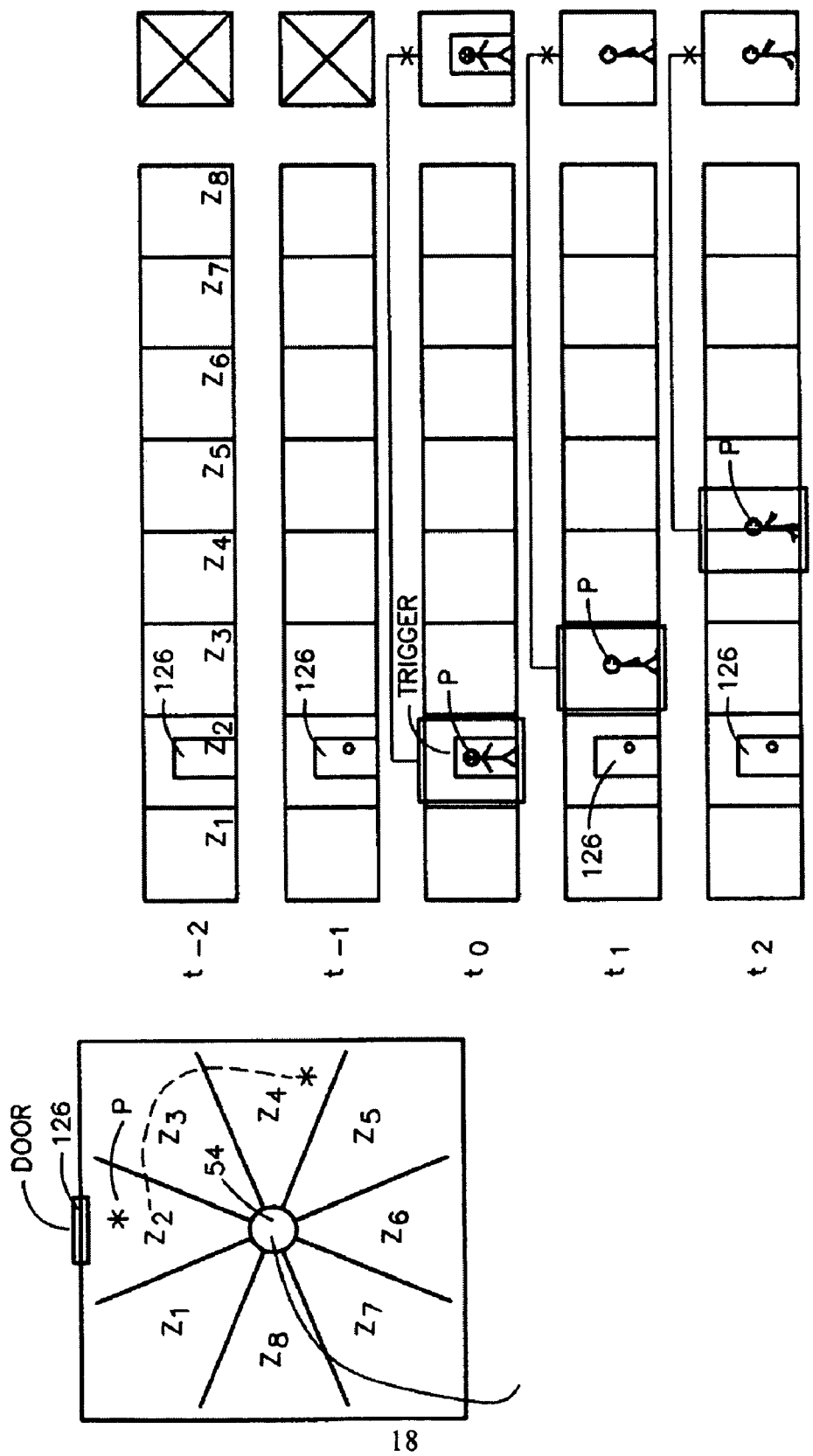
FIG. 15 is a panoramic camera configuration map utilizing the architecture of FIG. 11a and further showing a sequential progression of a strip display system as a subject or object moves through the sensor fields of the panoramic camera unit.

One of the important features of the various camera configurations is the ability to reconstruct the entire area being covered and to map an event as it progresses. Illustrations of this feature are shown in FIGS. 15, 16, 17 and 18, each of which show an example of a mapping and monitoring screen implementation. With reference first to FIG. 15, the upper left hand corner of the view comprises a map showing how a panoramic camera 54 is positioned to create full view zones Z1-Z8 in a typical room. Note the door 126 in zone Z2. The monitor is set to show all of the zones in a strip for a full panoramic view, as shown at the center of the view. As long as the scene does not change, the camera is in a dormant mode, with any images collected being stored in local memory 18, see FIG. 1. When a triggering event occurs, such as the door opening, the camera begins to transmit video signals. It first transmits signals indicating the condition of the scene just prior to the triggering event, as shown in time strips t-2 and t-1, along with the triggering event at to. Not only is the entire strip displayed, but also the sensor or sensors where the event is occurring are identified and may be the subject of a full screen view as shown on the far right of the view. Full streaming video of the event is then transmitted, with the most active sensor or sensors always being selected for a separate, full screen image. As can be seen this progresses from zone Z2 to zone Z3 from time tO to time t1 and from zone Z3 to between zones Z4 and Z5 at time t2. When in two zones, the image will be merged and cropped to provide a modified full screen view as shown at time t2. Such cropping and merging may be accomplished either in the camera appliance or in a centrally disposed server, as previously described. The perpetrator P can be tracked on the map as well as monitored in near real time on the strip and full screen monitors. The signal is also stored at the server for retrieval and reconstruction of the event, as more fully described in by aforementioned copending application.

Figure 15A:
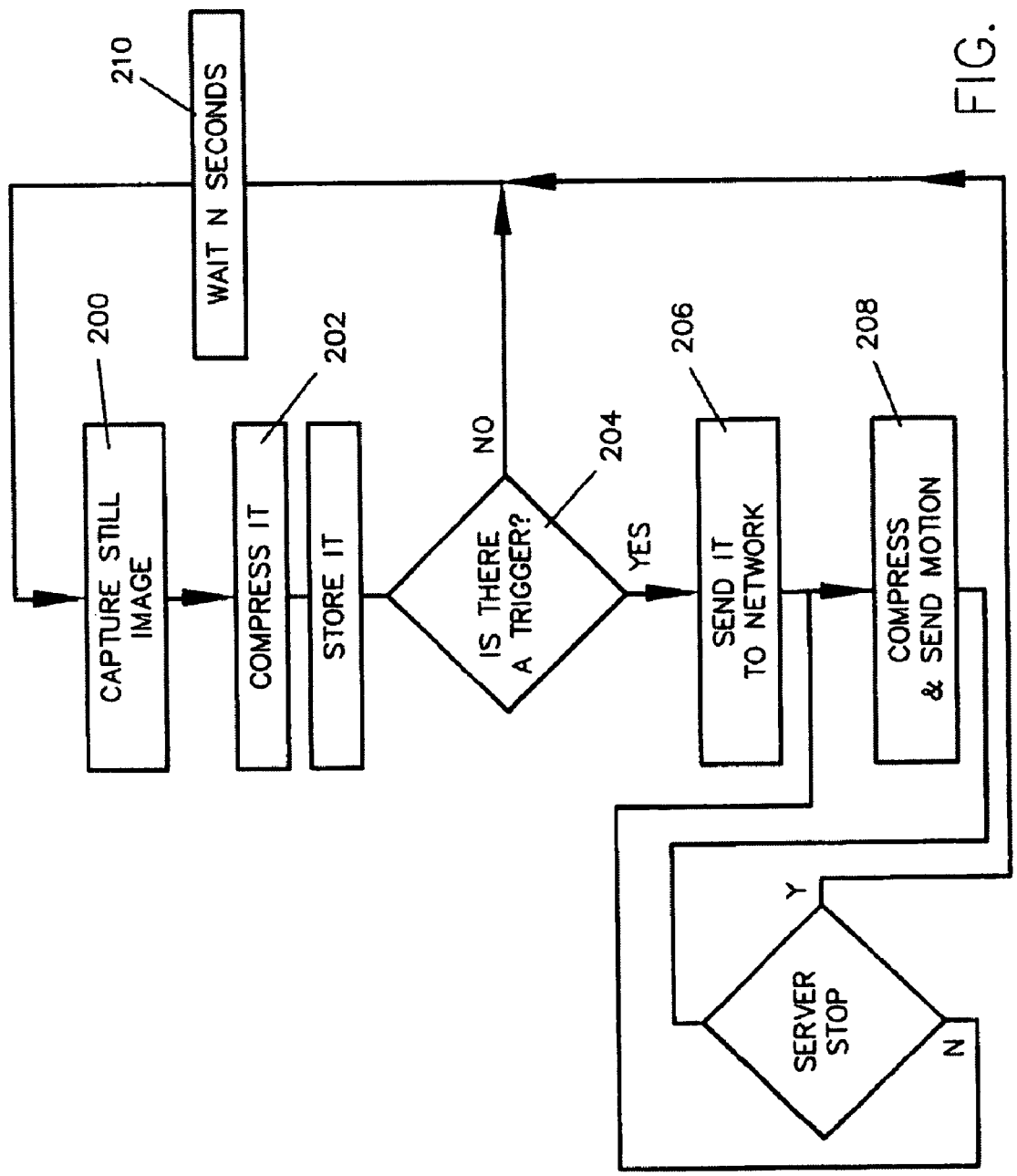
FIG. 15a is a flow chart of the management of the display system in FIG. 15.

A flow chart for the system of FIG. 15 is shown in FIG. 15a. Prior to the triggering event, images are captured, compressed and stored but not sent to the network as indicated at 200 and 202. If there is a trigger event or "YES" response at 204 the compressed motion video is transmitted to the network as shown at 206 and 208. The camera continues to transmit compressed motion video until the triggering event or condition has stopped for some predetermined period. If a "NO" response is indicated the image is saved for a predetermined period of time and indicated at 210.

Figure 16:
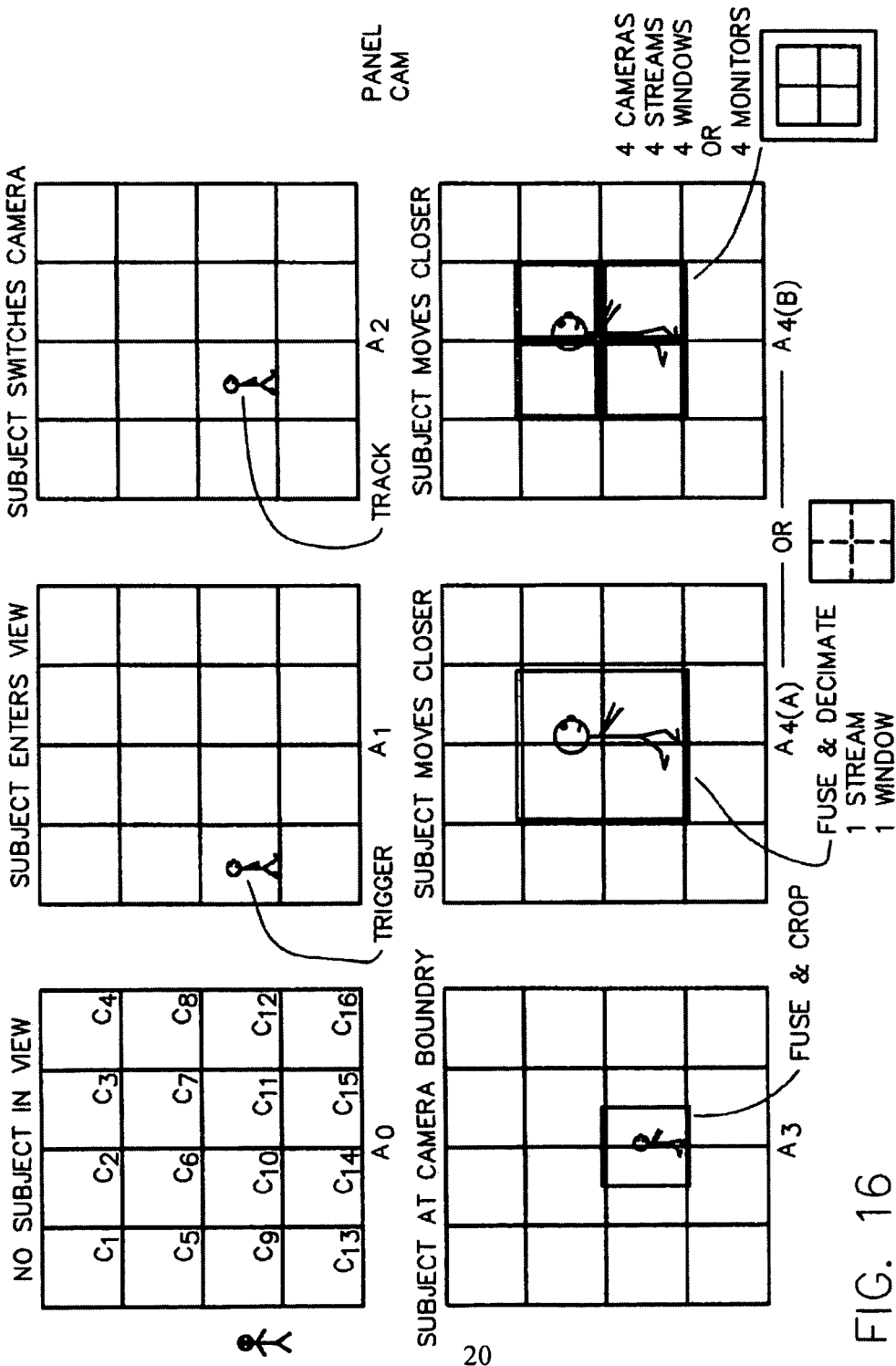
FIG. 16 is an illustration showing a sequential progression of a matrix display system as a subject or object moves through the sensor fields of a stacked panel camera such as that shown in either Fig.

FIG. 16 shows a similar scheme for a multiple row panel camera. Prior to a trigger event, such as at time A0, the panel camera the various image sensors C1 through C16 send no motion video signal to the network. Upon detection of a trigger event, such as at time A1 where a subject enters the field of view of image sensor C9, the camera begins to capture, compress, and transmit to the network the video from sensor C9. As the subject moves across the array's field of view, different sensors are enabled so as to track the subject as at time A2. For example, at time A2 the subject has moved into the field of view of sensor C10. At time A3, the subject is on the boundary of sensors CIO and C11, causing both sensors to be enabled. As previously discussed, the respective images from sensors C9 and C10 are cropped and fused by the camera or by the remote server. Multiple sensors may be so fused, as depicted at times A4 and A5, where the subject spans the field of view of 4 sensors. Alternatively, the video from all activated sensors may be independently compressed and transmitted. This allows a user at a remote monitoring station to virtually tilt, pan, and zoom the camera array via suitable manipulation of the received images.

Figure 17:
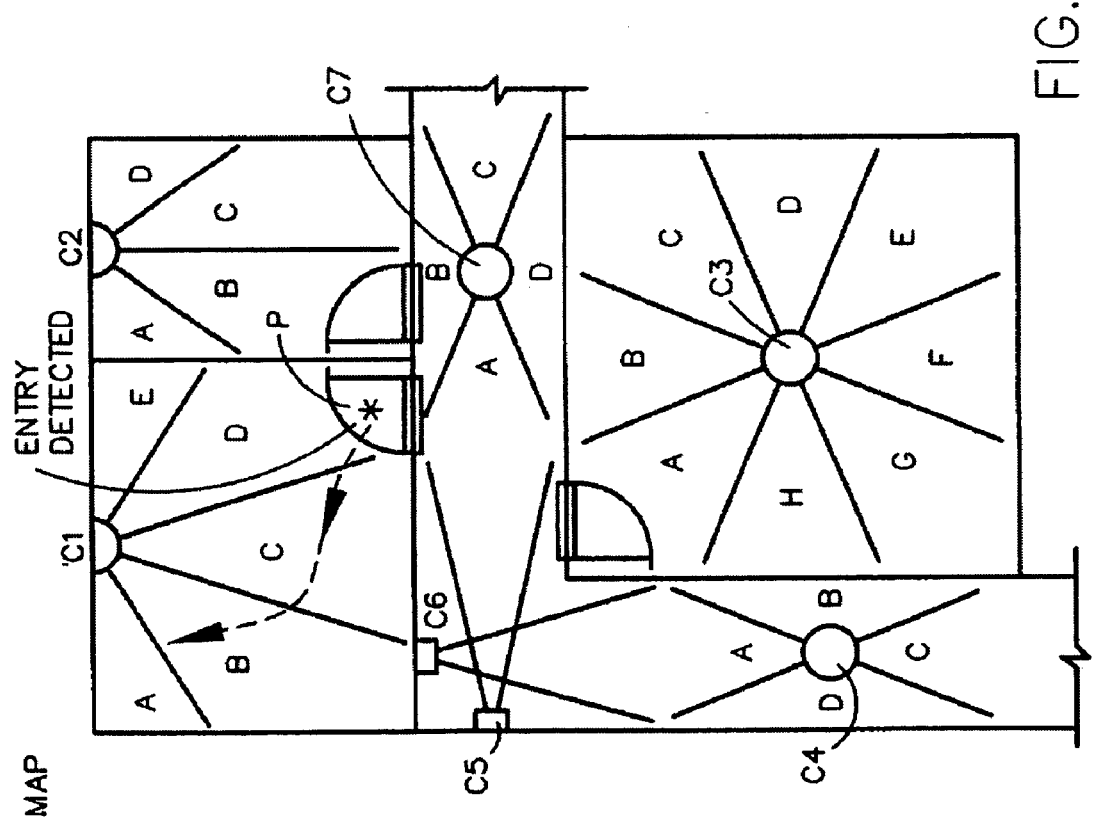
FIG. 17 is a mapping display utilizing multiple camera units in accordance with the subject invention.
Figure 18:
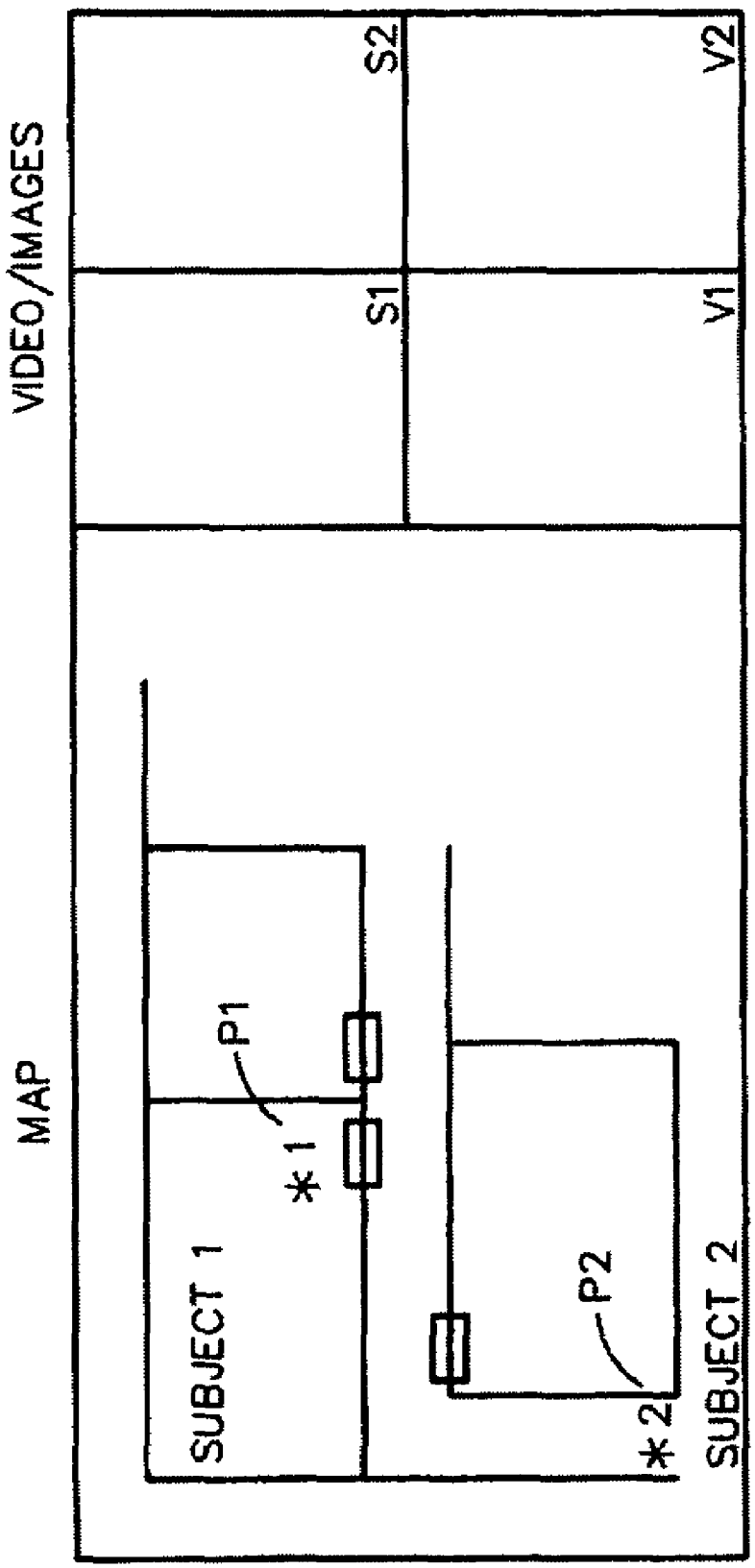
FIG. 18 is an illustration utilizing the mapping display in combination with a video image as presented on the display at a monitoring station.

FIG. 17 shows a complex map for a multiple room, multiple camera installation, wherein a plurality of cameras C1-C7 are strategically placed to provide full coverage of the installation. As noted, the progress of perpetrator P can be tracked on the system map and the various activated cameras can transmit both full view and selected screen images, as previously described. The typical monitor screen for the system of FIG. 17 is shown in FIG. 18, with the map on the left, as in FIG. 15 and the selected zones being depicted on the multiple window display on the right. High resolution still images from cameras P1 and P2 may be displayed in windows S I and S2 respectively, while motion video from cameras P1 and P2 may be displayed in windows V1 and V2 respectively.

Figure 19:
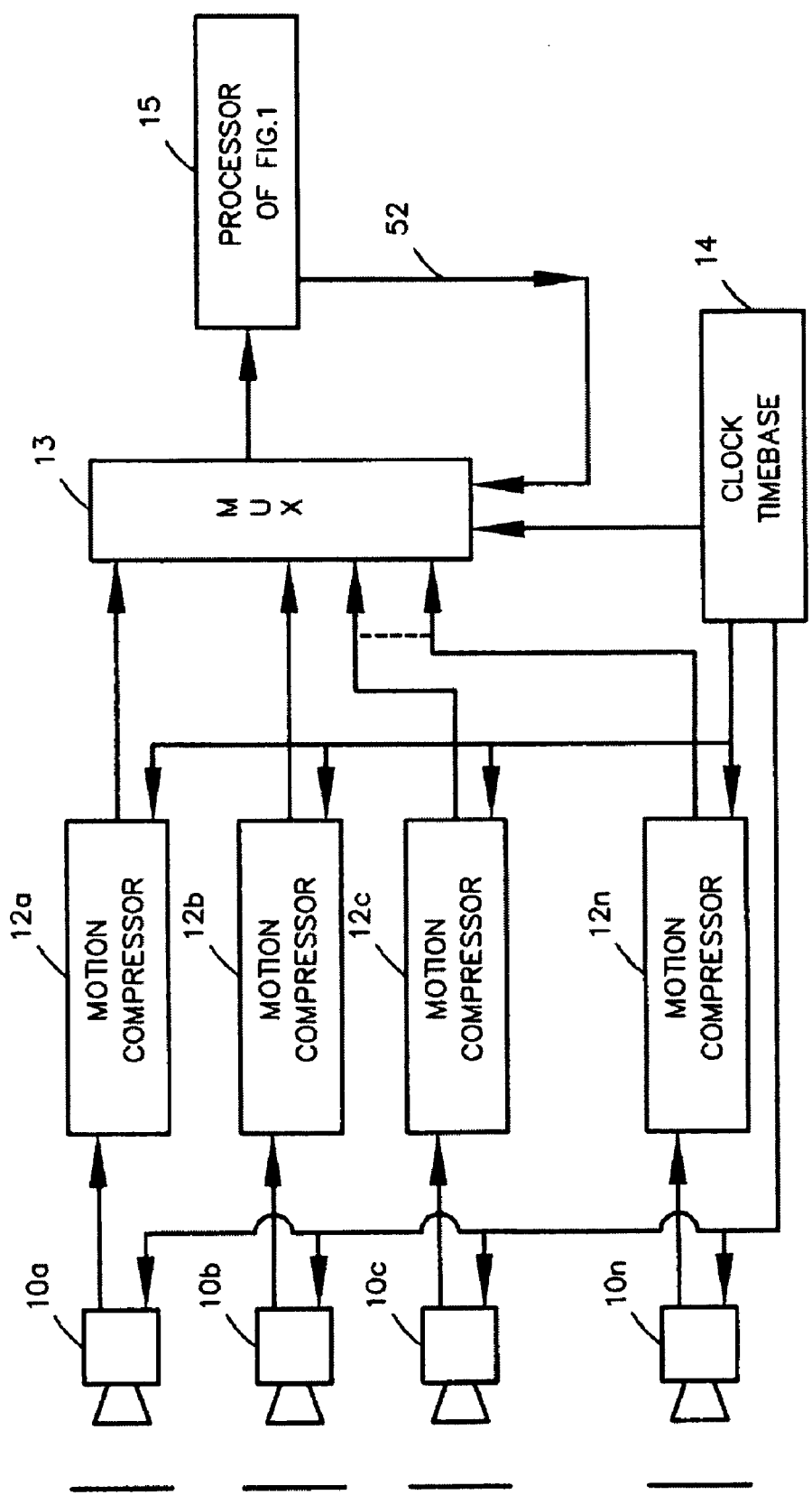
FIG. 19 is an alternative configuration allowing multiple sensors and/or multiple cameras to be activated selectively in an independent mode and/or in a simultaneous mode

FIG. 19 is an illustration of a modified multiple sensor array configuration similar to that shown in FIG. 2. In this embodiment, a separate motion compressor 12a-12n is associated with each sensor 10a-1On in advance of the multiplexer 13. This permits more than one sensor image to be transmitted simultaneously by reducing the required bandwidth of information transmitted from each sensor into the multiplexer. In this manner more than one camera may be live at any one time. Selection of active cameras is made by the processor 15 or by the network connected server in response to predetermined trigger conditions or programmed controls. This would apply to any co-housed array of spherical, panoramic and panel cameras, and could apply to multiple camera installations as well. It is particularly useful when more than one zone is hot at one time, as described in accordance with FIGS. 15-18.

Figure 20:
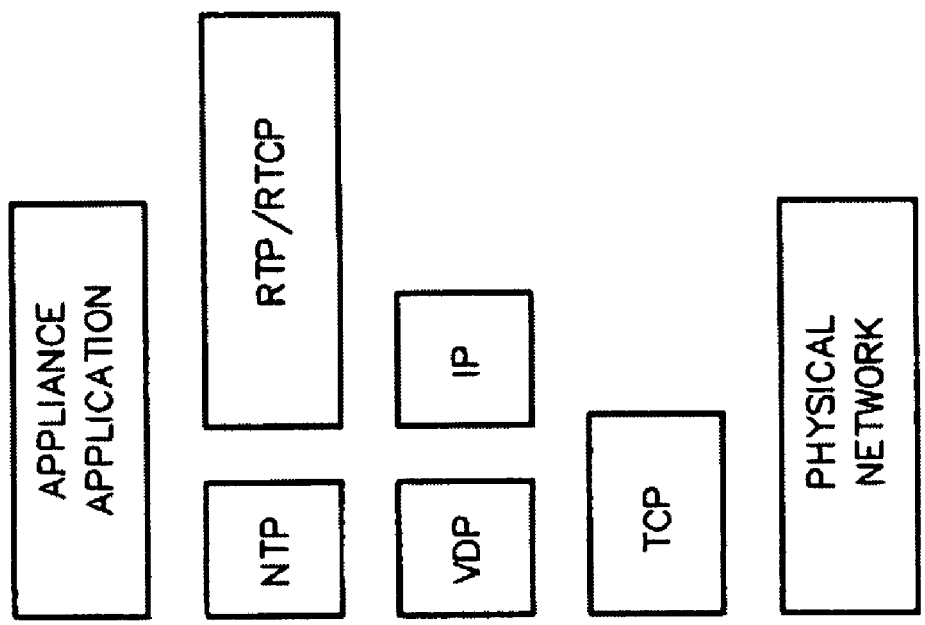
FIG. 20 is an illustration of the protocol layers between the network and the camera system.

As shown in FIG. 20, there is a multiple layer protocol stack to support the camera system. Starting at the top, as drawn, the appliance control software resides in the application layer. A network protocol to synchronize the camera to an external clock may be employed such as network time protocol NTP. A network protocol to efficiently pass and control continuous streaming data, such as real time protocol/real time control protocol RTPIRTCP may be employed. A protocol to packetize and send the data either with error checking, or without, such as UDP or IP, may be employed. A protocol to control transmissions over the physical network, such as TCP, may be employed for connecting the system to the physical network.

Figure 21D:
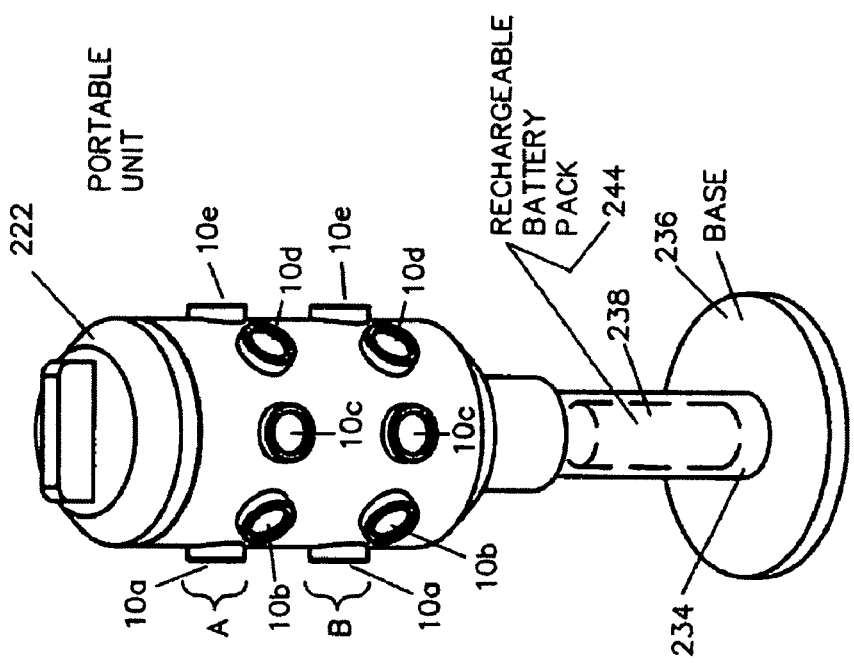

FIGS. 21a, 21b, 21c and 21d are perspective views of a multiple row 360-degree panoramic camera in various configurations. As there shown, and as previously described, the camera includes a cylindrical housing 220 with multiple rows of sensors or lenses, as shown row A having sensors 10a-10h (10e-10h being hidden from view) and row B having sensors 10a-10h (10e-10h being hidden from view). In this embodiment a removable cap 222 is provided (see also FIG. 21b). A WLAN transceiver card 224 is provided for communicating via wireless transmission, and a removable hard drive 226 is also located under the cap. This permits removable and portable on-board storage. The lower end of the configuration of FIG. 21a includes connector for power cables 228 and CAT-5 cable 230 or the like. It will be noted that there is not any need for CAT-5 cable when the wireless LAN card 224 is used as the network link. The lower portion 232 is adapted for receiving a mounting post 234 that is hollow for housing the cables 230 and 228. In the configuration specifically shown in FIG. 21c, the unit is flipped upside down and is suspended from the ceiling via a ceiling mounting post 240. In this case the wiring and cabling is carried in the ceiling post. FIG. 21d is portable configuration with a base 236 on the post 234. A rechargeable battery supply 238 is housed in the post 234. The camera will communicate with external units via the WLAN card 224. All image data can be stored on the portable hard drive 226 or, where desired can be transmitted via the WLAN card. A laptop computer can be cable connected to the unit such as with Cat-5 cable 230, or can communicate via the WLAN card to provide set-up, control and playback support.

Figure 22:
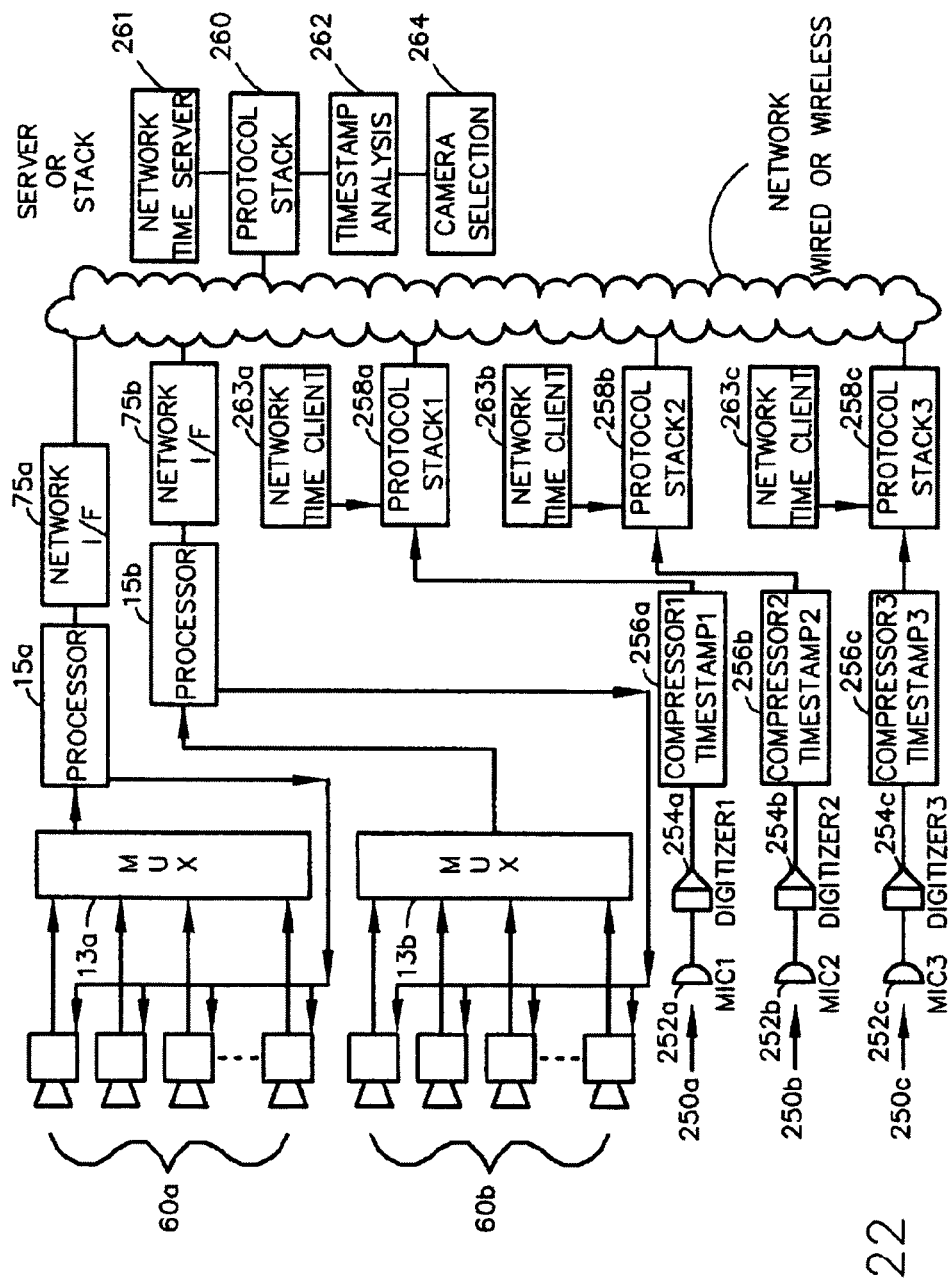
FIG. 22 is a system configuration using the multiple sensor arrays of the invention with strategically placed acoustic detectors for triangulation and pinpointing of an acoustic event.
Figure 23:
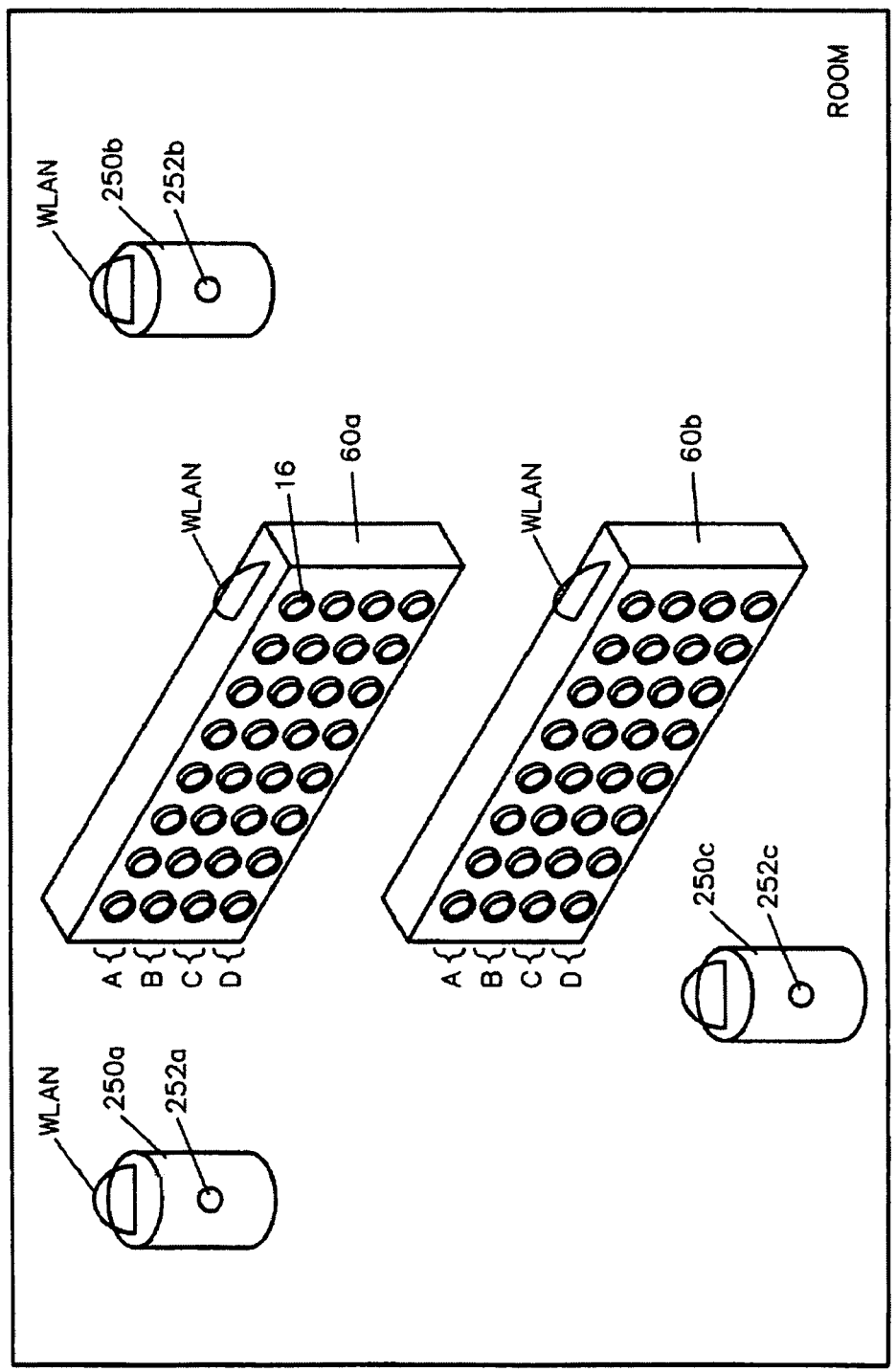
FIG. 23 is a diagrammatic illustration of an installation in accordance with the system of FIG. 22.
Figure 24:
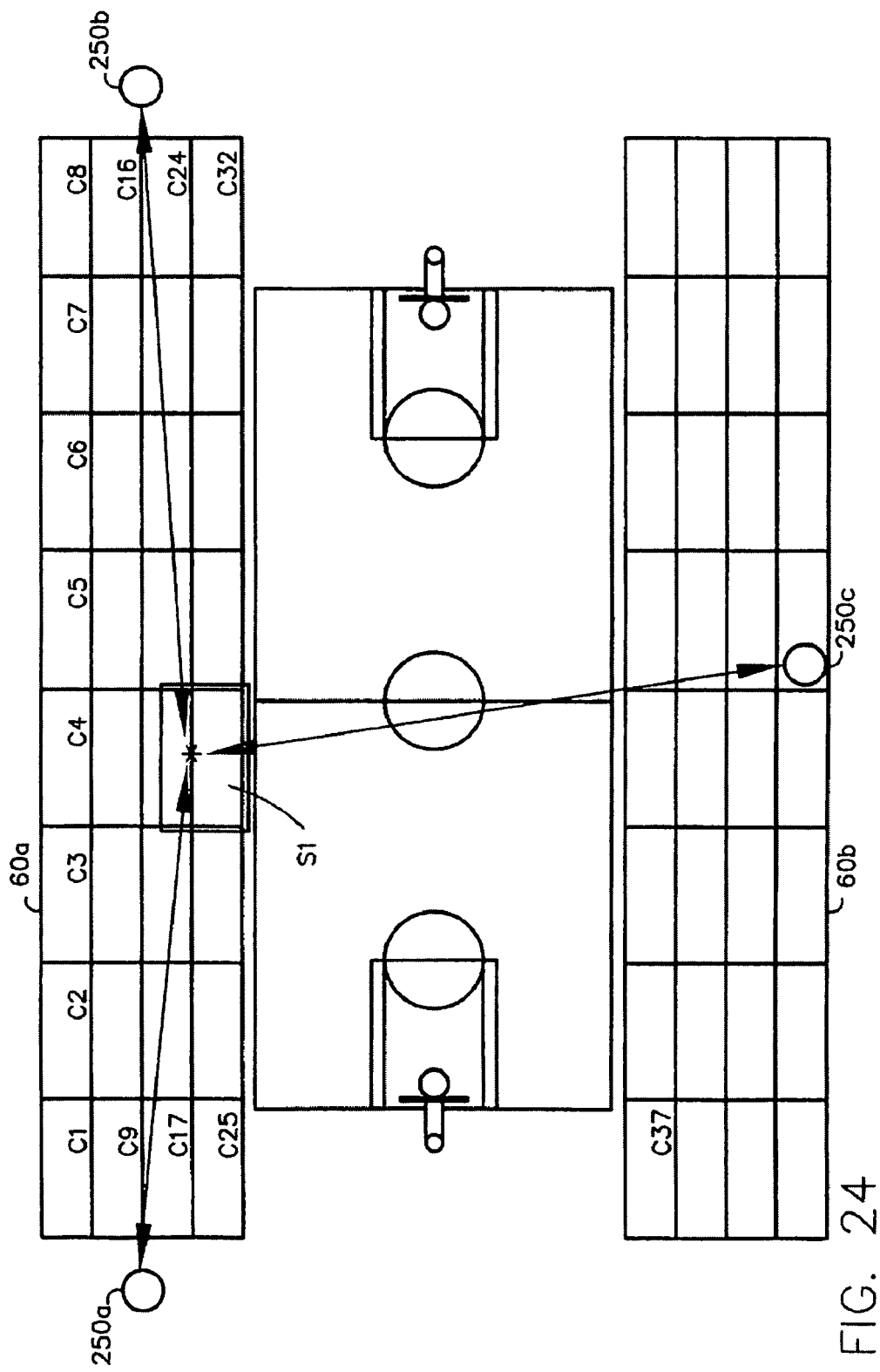
FIG. 24 is a mapping diagram showing the use of the system of FIGS. 22 and 23 to identify the precise location of an acoustic event.

FIGS. 22, 23 and 24 illustrate a system configuration utilizing the array camera systems of the subject invention in combination with strategically placed acoustic detectors in order to pinpoint the location of an acoustic event such as a gunshot, explosion or the like. With specific reference to FIG. 23, a plurality of panel cameras 60a and 60b are mounted in a planar array as in FIG. 5, and are disposed to monitor the seating section of an arena. The array cameras 60a and 60b are connected to the network via a WLAN as previously described. A plurality of strategically placed acoustic detectors 250a, 250b and 250c are also placed in the arena and communicate with the network via a wired or wireless LAN. As shown in FIG. 22, each camera 60a and 60b is connected to the network through a network interface, as previously described. Each acoustic detector 250a, 250b and 250c is also connected to the network. It should be understood this can be a wired or cabled system or wireless with out departing from the scope of the invention. Network timeserver 261 in FIG. 22 utilizes network-based clock synchronization protocols such as NT? or SNIP to maintain the common accuracy of the respective network time clients 263a, 263b, and 263c.

Each acoustic detector in FIG. 22 includes a microphone 252 (a, b, c, respectively) a digitizer 254 (a, b, c, respectively) a compressor/time stamp module 256 (a, b, c, respectively) and a protocol stack 258 (a, b, c, respectively). Acoustic events can thus be transmitted to the network protocol stack 260 for time stamp analysis as indicated at 264. The server compares the differential times of arrival of a given acoustic stimulus at the respective acoustic sensors, and thereupon computes the location of the event using common triangulation methods. The server selects the appropriate camera array 60a or 60b in FIG. 23, and the specific camera array row A, B, C or D and the specific image sensor 10a, 10b, 10c, 10d, 10e, 10f, 10g, or 10h is selected to view the area where the acoustic event occurred. With specific reference to FIG. 24, by time stamping the event at each acoustic sensor 250a-250c, the precise location of the event can be determined. The server (FIG. 23) selects the sensor that is trained on that location, which thereupon transmits image data for reconstructing and monitoring the event as it happens. As before, pre-event, event and post-event images may be viewed.

Figure 25:
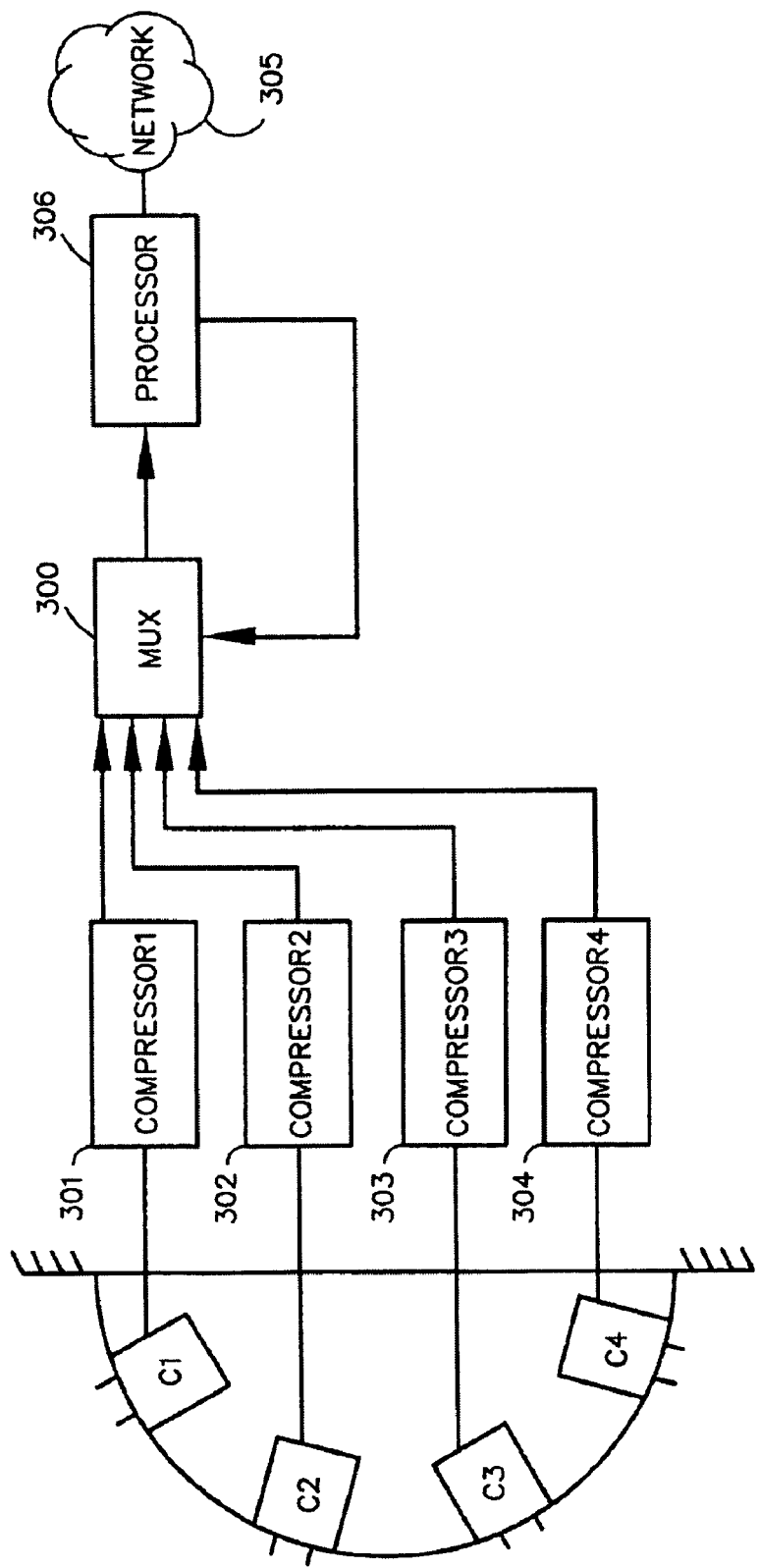
FIG. 25 is an illustration of a multiple camera system incorporating compressors associated 15 with each camera in advance of a multiplexer.

FIGS. 25-30 illustrate the circuitry and systems for providing image data at the monitoring center in accordance with the multiple transducer technology as shown in described in FIGS. 15-18. Management of the video and still image data at the monitor station is a critical part of the camera system of the subject invention. Using FIG. 15 as an example, it is important to be able to select and monitor specific zones in a fashion providing meaningful data to the monitoring personnel. As shown in FIG. 25, one configuration for accomplishing this includes a plurality of zone transducers as indicated at C1, C2, C3 and C4 and the associated compressors 301, 302, 303 and 304, respectively. The compressed signals are then introduced into a multiplexer 300 and into a processor 306. Panning signals are sent from monitoring the station to the camera processor. The processor selects the correct camera(s) or transducer(s), based on the current pan position, by control of the multiplexer. Frame (zone) switching at the multiplexer is synchronized of the beginning of full image frames, for example, on I-frame boundaries in an MPEG system.

Figure 26:
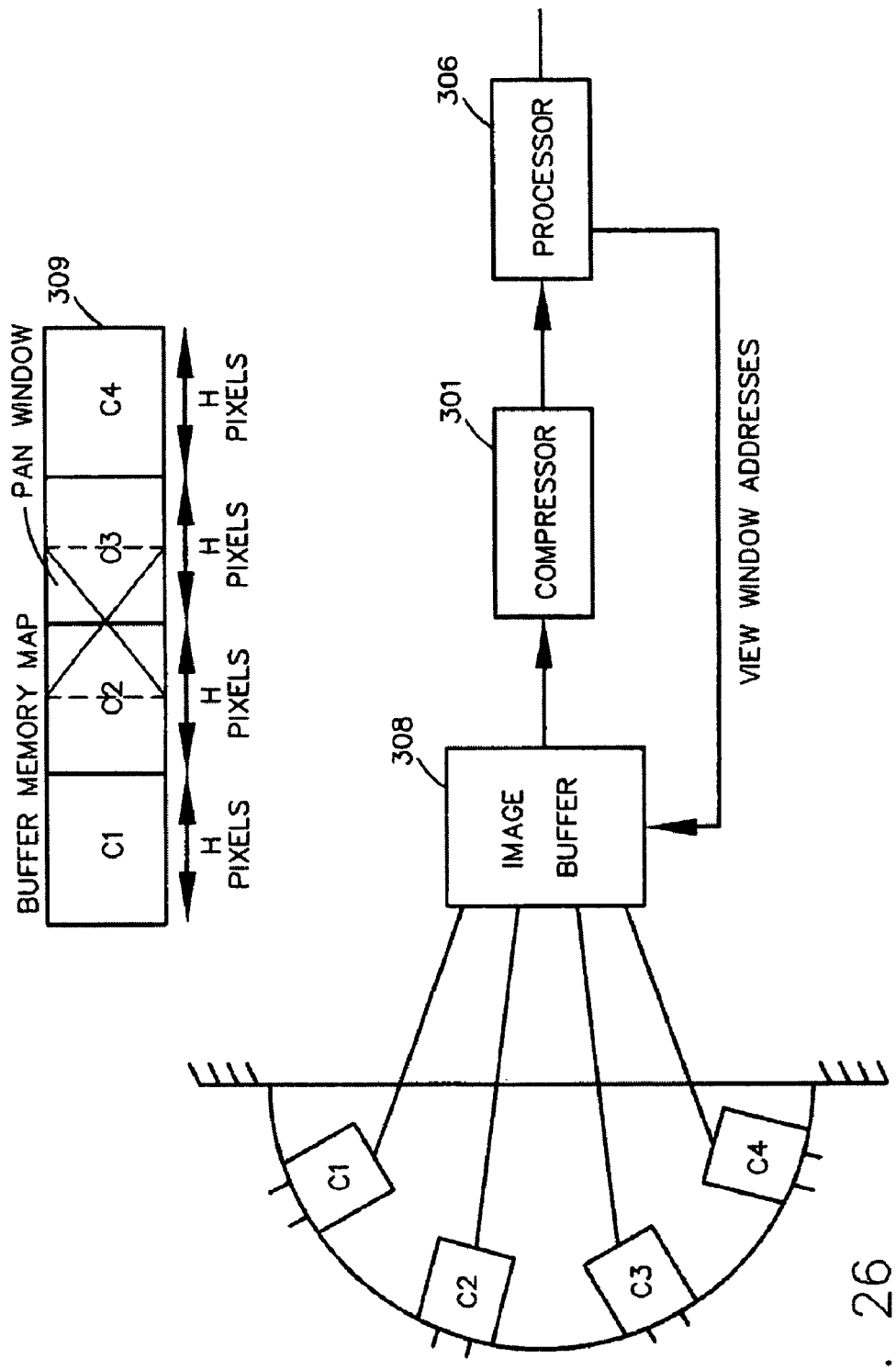
FIG. 26 is an illustration of a multiple camera system incorporating an image buffer in combination with a single compressor.

An alternative configuration is shown in FIG. 26. This depicts introducing the transducer feeds directly into an image buffer 308. This signal is then introduced into the compressor 302 and from there into a monitor processor 304. The single compressor is shared among the multiple transducers C1, C2, C3 and C4. Image data from all cameras is stored in a single image buffer. Pan position data from the monitoring station controls location of the readout window 309 from the image buffer. An additional advantage of this configuration is that the camera-to-camera overlap may be cropped out of the image. This may be accomplished via manipulation of the buffer read or write addresses. For example, it may be determined during setup that C1's image begins to overlap with camera C2's image at horizontal pixel location 1100. Knowing that, the pixel write strobes from camera C1 may be suppressed starting with clock 1101, and write strobes into buffer 308 for C2 may be substituted. Alternatively, all pixels from all cameras C1-C4 may be written into buffer 308. When the buffer read address counter reaches a horizontal address of 1100, then an offset may be added to the read address to point to the next spatially subsequent location in the buffer, which represents pixels from C2. Note that, by command from the remote monitor, the pan location may be sequentially specified in increments as small as one pixel, thus allowing panning or scrolling to be smooth and continuous.

Figure 27:
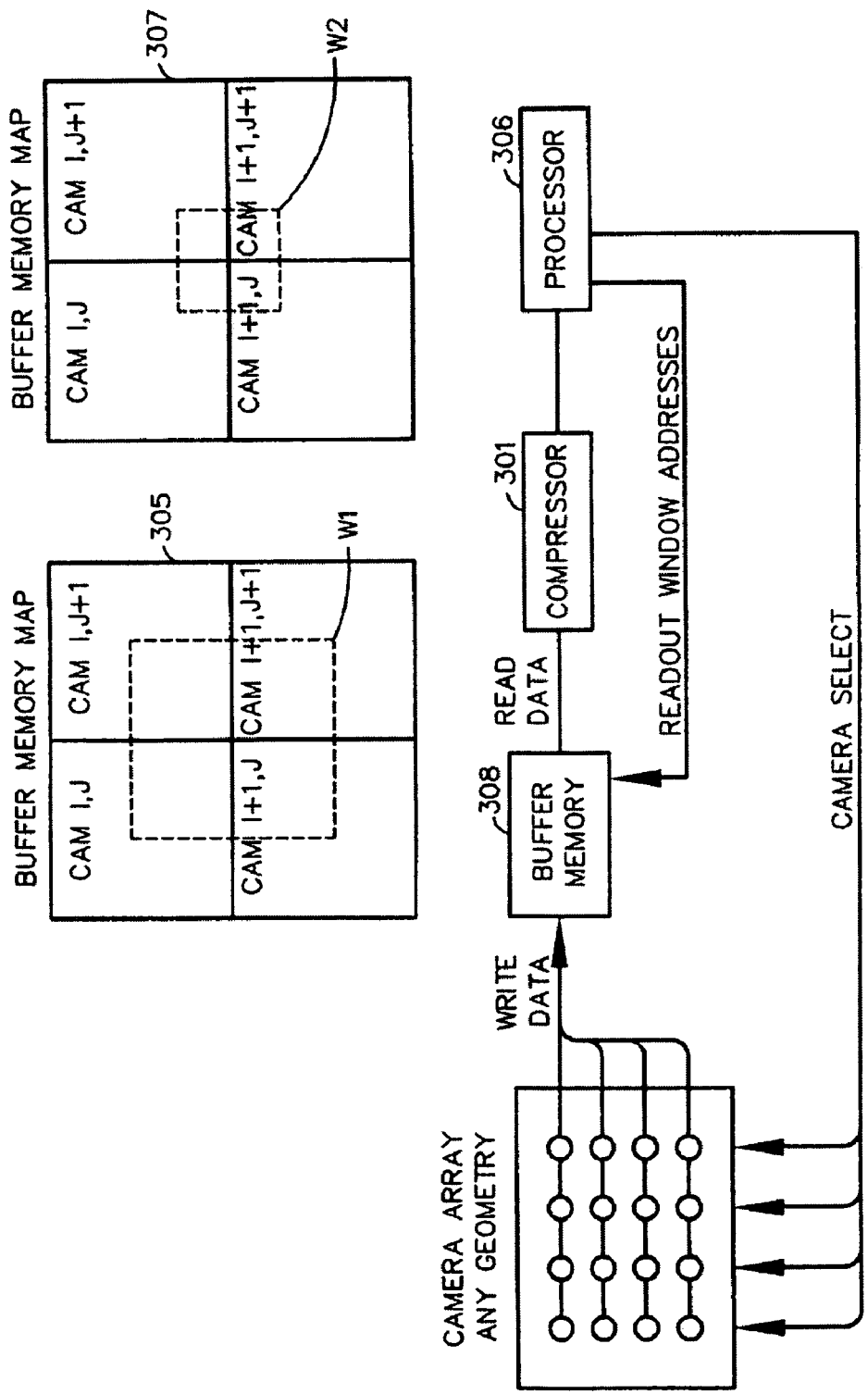
FIG. 27 is an illustration of an array type camera utilizing the buffer/compressor combination of FIG. 26.

Another alternative configuration is shown in FIG. 27. In this configuration the method for panning an array camera of any geometry in the x and y-axes permits pan, tilt, and zoom viewing.

The buffer memory 308 is divided into four or more quadrants as shown at 305. Image data from a selected group of any 4 adjacent zone cameras or transducers is directed to the buffer as shown.

Pan, tilt, or zoom data from the monitor station is translated into readout window addresses from the buffer. When the readout window reaches an edge of the buffer, camera selection is incremented or decremented as appropriate, and the readout window is moved accordingly to continue the pan.

Additionally, zooming may be accomplished by incrementing more than one pixel or line in succession, effectively altering the camera's field of view as illustrated with windows W1 and W2. Inter-pixel or inter-line interpolation is then used to prevent sampling artifacts.

Figure 28:
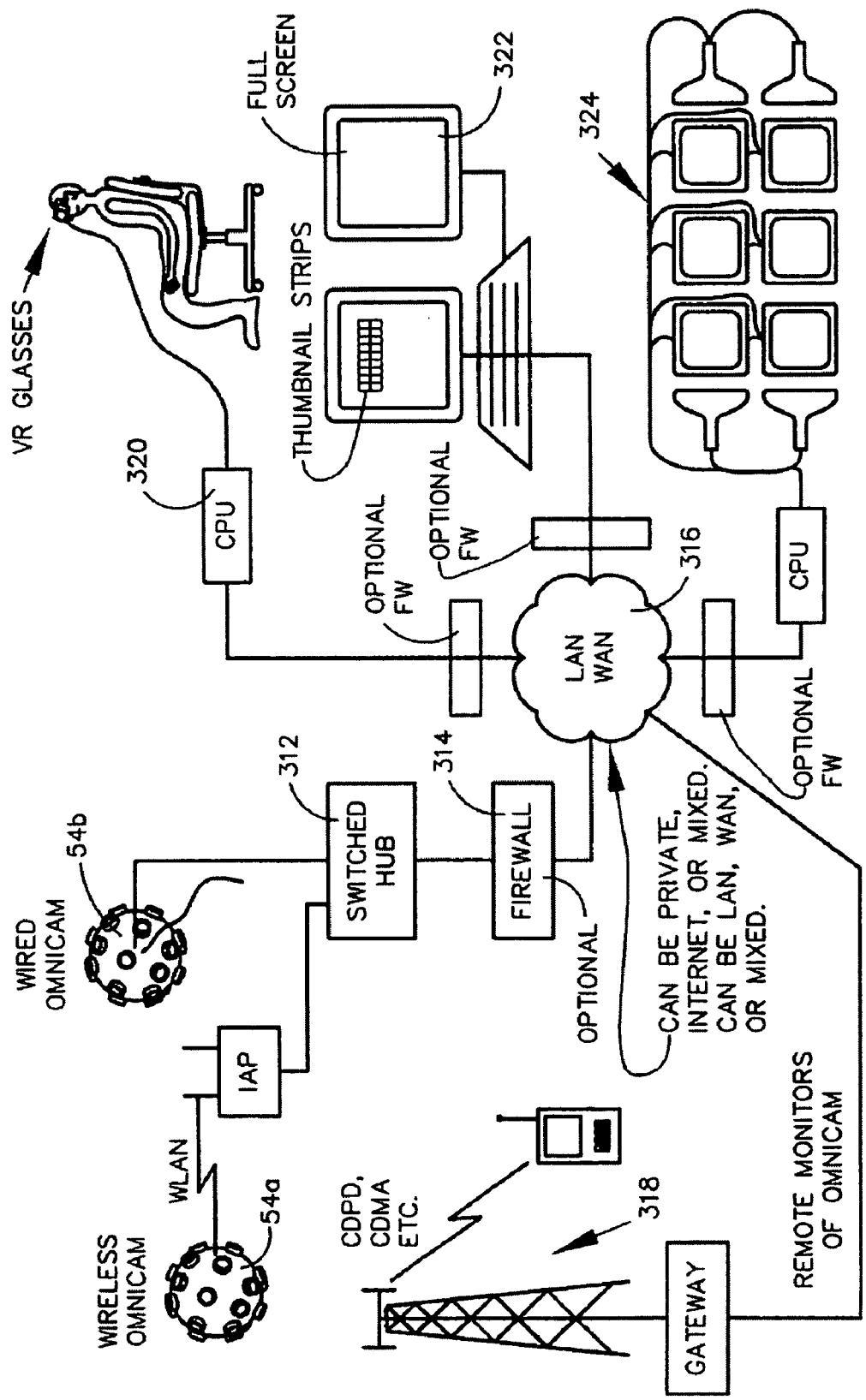
FIG. 28 is system diagram.
Figure 29:
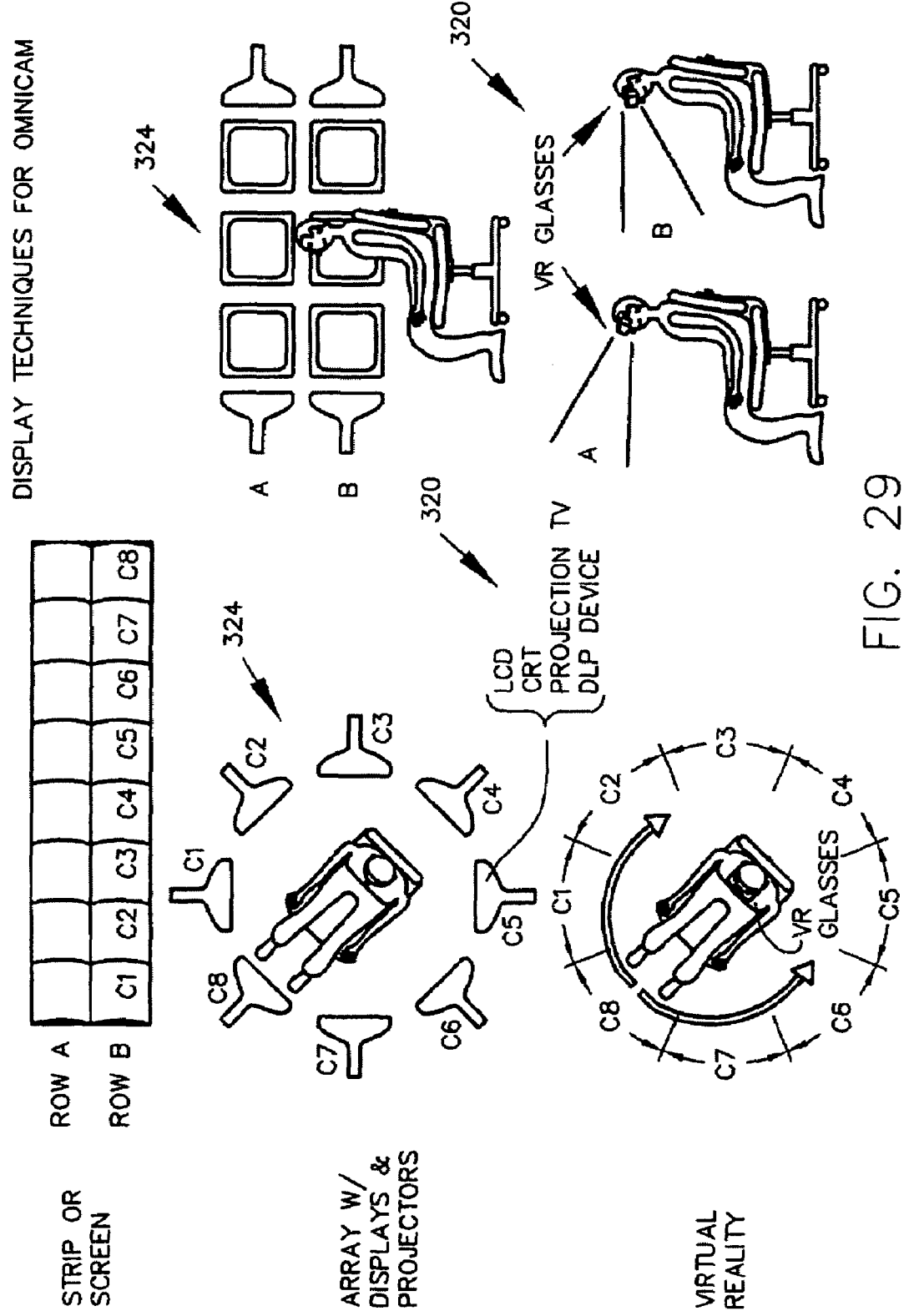
FIG. 29 is an illustration of various monitor layout schemes.
Figure 30:
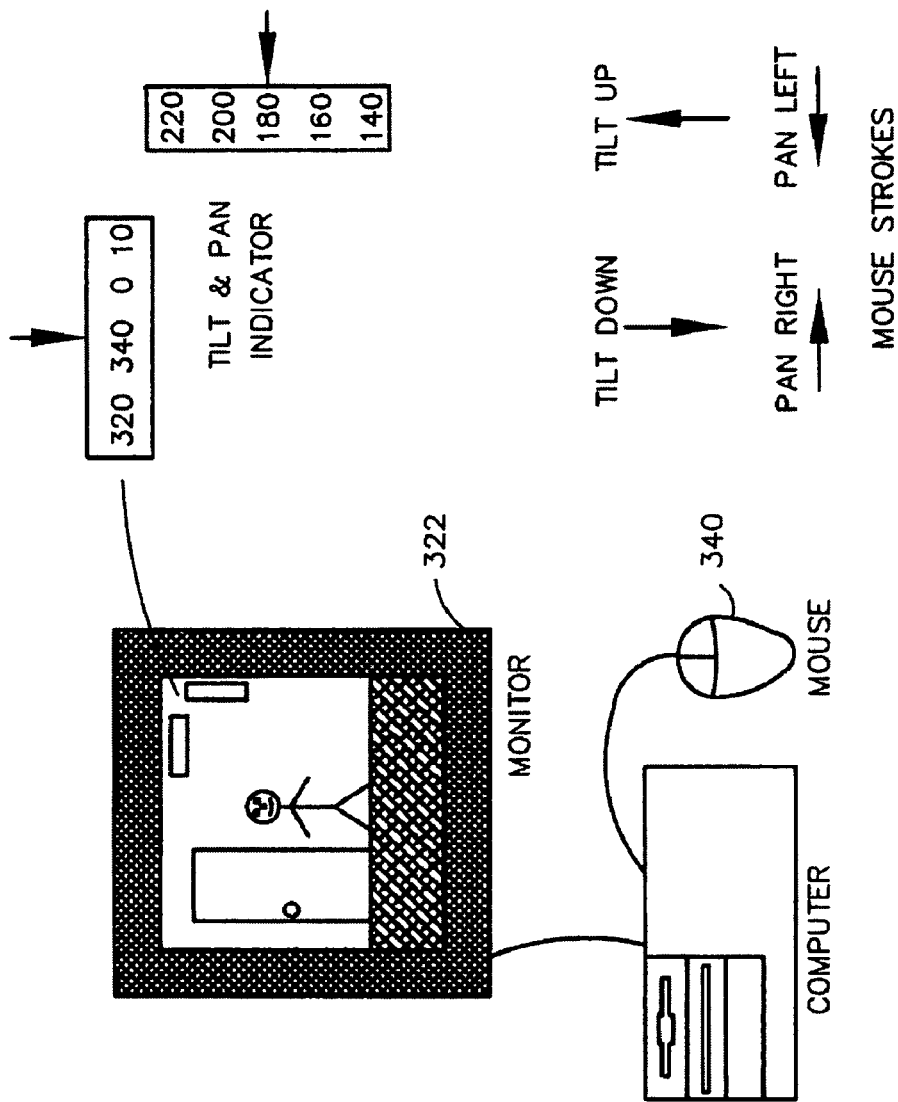
FIG. 30 shows a scrolling capability utilizing a single screen and a mouse.
Figure 31:
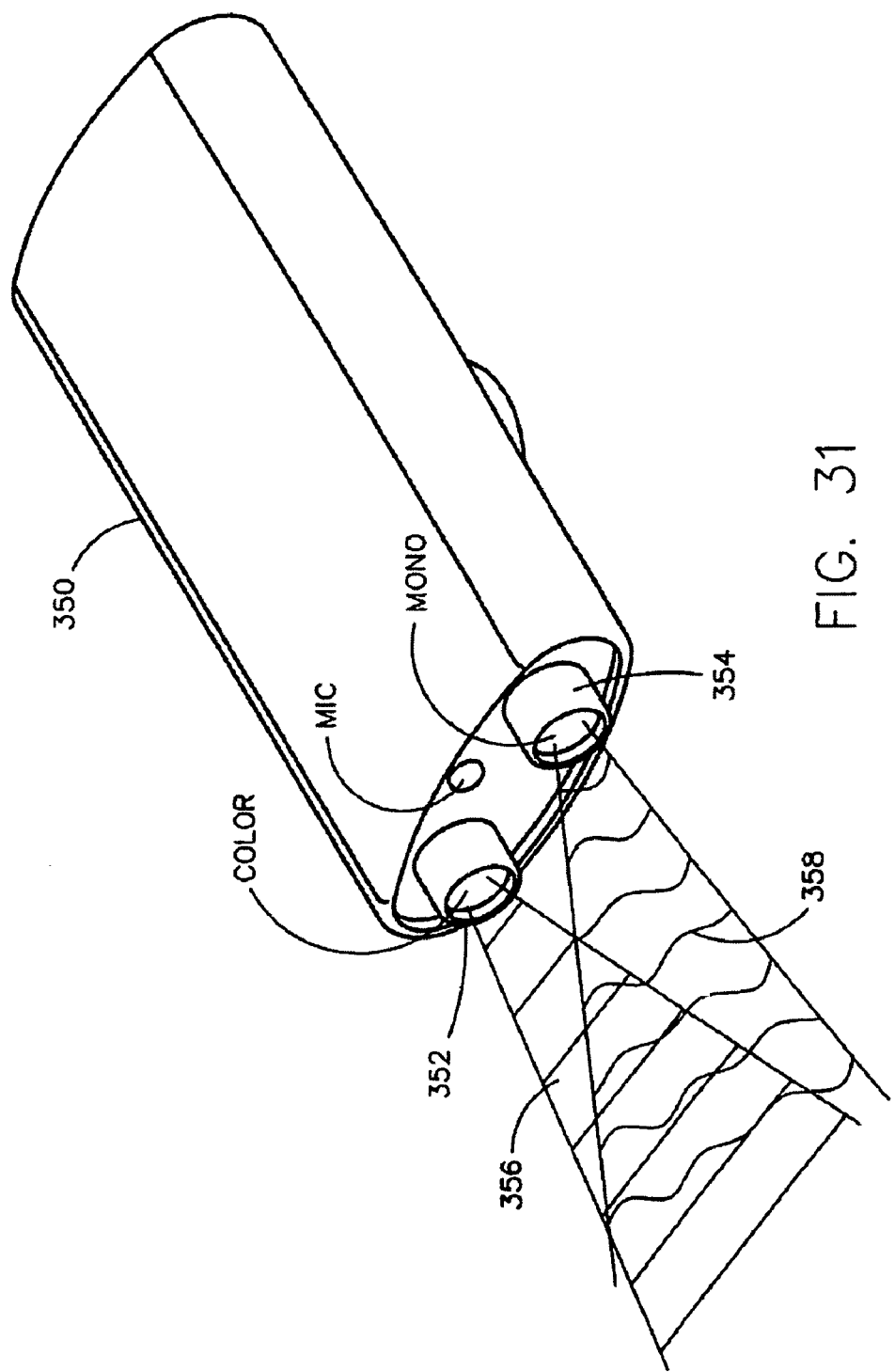
FIG. 31 shows a single housing with both color and monochrome cameras.

These various configurations permit the monitor setups as shown in FIGS. 28-30. As shown in FIG. 28, the various array cameras 54a, 54b and the like are introduced through a switched hub 312 and an optional firewall 314 to the network 316 for distribution via the network to a plurality of monitoring stations such as the remote wireless monitors 318, the virtual reality monitoring station 320, the single screen, multiple window monitor 322 and the multiple monitor array 324. Using the image collection techniques described in connection with FIGS. 15-18 and the display techniques described in connection with FIGS. 25-27, each of the monitoring stations can pan the entire area being surveyed using a panning methodology. As shown in the composite view 29, in the multiple monitor array system 324 each of the monitors corresponds to a specific zone as defined by the respective transducer C1-C8. This permits personnel to sit in the center and recreate the scene as if he were sitting in the center of the monitored area. The same technique is also used in the virtual reality station where the scene is recreated on the virtual reality glasses depending upon which direction the user is actually facing. FIG. 30 is illustrative of a single monitor, single window panning technique such as that which might be used in connection with full screen, single window monitor 322 of FIG. 27. In this embodiment, the movement of the mouse 340 controls the panning action. The user can pan in any direction using the mouse and where 360-degree zones are setup the user can pan continuously in any direction.

Figure 32:
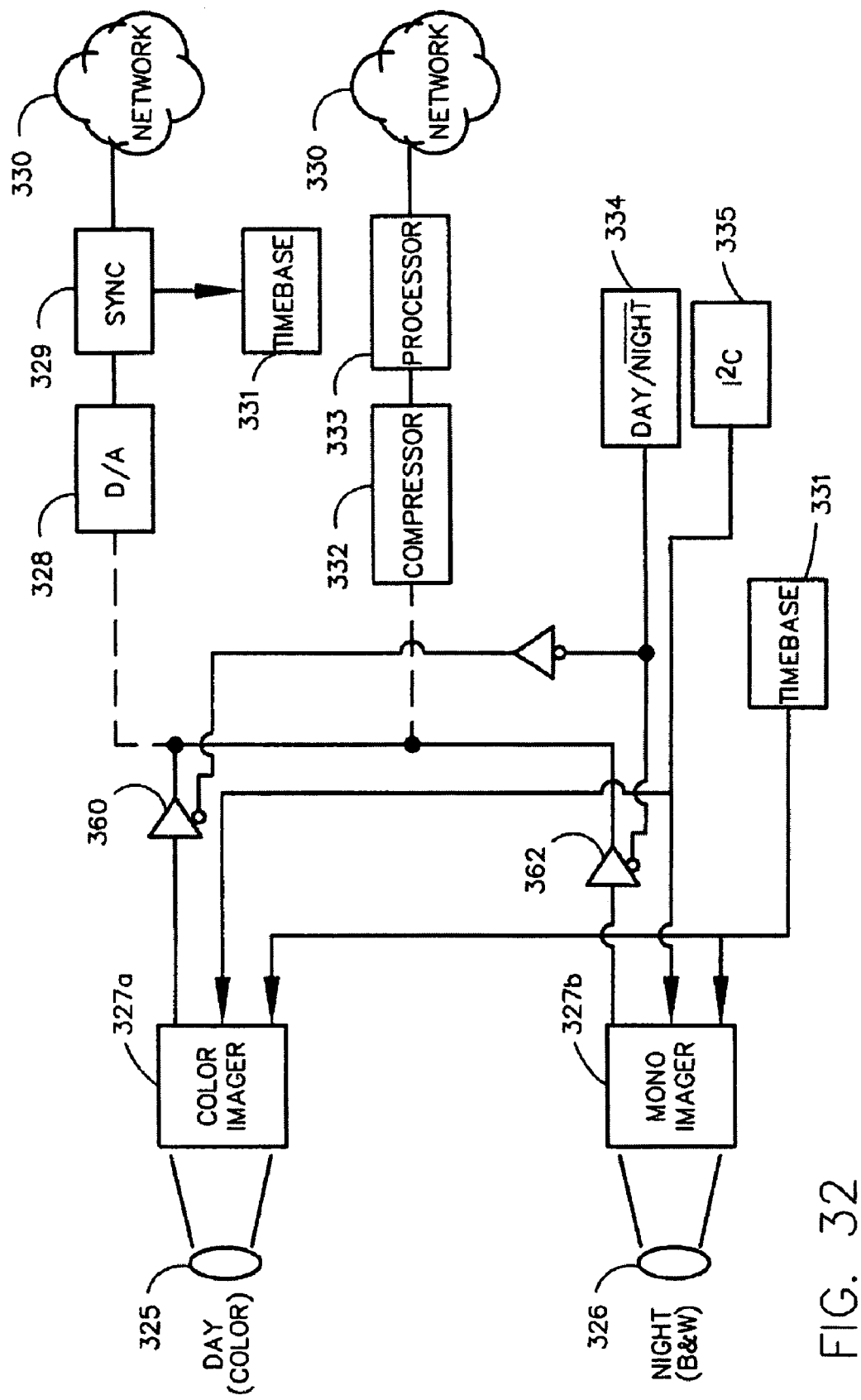
FIG. 32 illustrates selection of either the color or monochrome camera of FIG. 31.

Cameras designed to render color images typically suffer from reduced luminous sensitivity, compared with monochrome cameras. A method to overcome this deficiency is illustrated in FIGS. 31-36. A single camera housing 350 in FIG. 31 contains a color camera 352 with a field of view 356, and also contains a monochrome camera 354 encompassing a field of view 358. FIG. 32 depicts the system in greater detail. A binary signal DAY/-NIGHT 334 controls the state of a multiplexer consisting of transmission gates 360 and 362, so as to select the output of either color imager 327a or monochrome imager 327b. The selected video is compressed by compressor 332, then transmitted to the network 330 via processor 333. An alternative analog implementation is also depicted in FIG. 32. In this implementation, the imagers 327a and 327b are analog imagers, and transmission gates 360 and 360 pass analog signals to D/A converter 328. Composite sync signals are added by the SYNC circuit 329, which derives it's timing from the common system timebase 331. An analog composite video signal is thereupon passed to the analog transmission medium 330.

Figure 33:
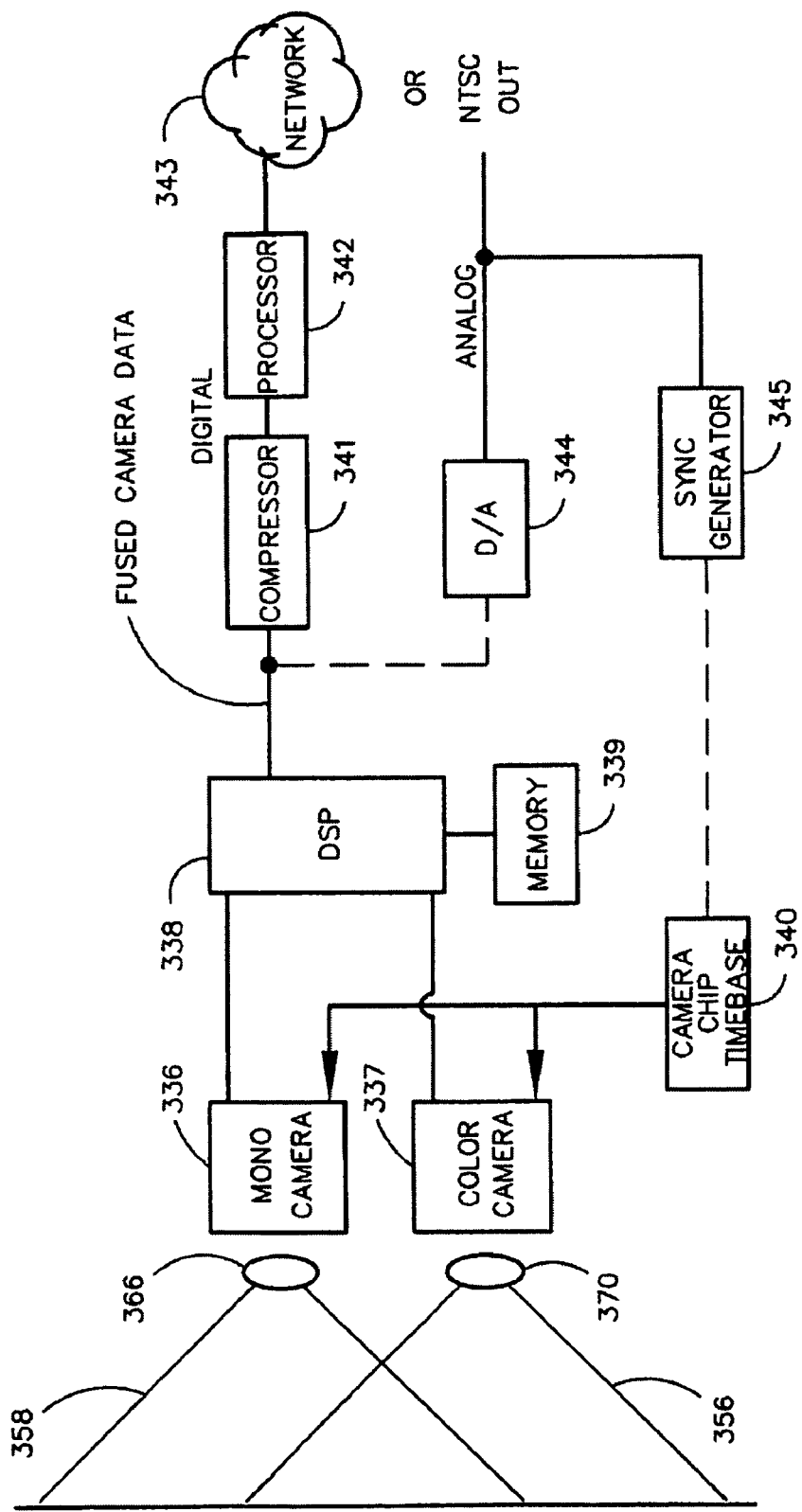
FIG. 33 describes fusion of the images from the respective cameras.

FIG. 33 depicts an alternative embodiment which illustrates the fusion of a color and monochrome image from two different cameras. Monochrome camera 336 and color camera 337 produce separate video signals, which are then applied to signal processor 338. The cameras are fitted with lenses 366 and 370, viewing respective fields of view 358 and 356. Cameras 336 and 337 are immediately adjacent, and lenses 366 and 370 are functionally identical. Further, both cameras are referenced to a common timebase 340. As a result, the cameras view essentially the same scene, and produce video signals that are essentially identical other than the absence of chrominance information in the monochrome camera. The parallax error between the two cameras is effectively eliminated by a simple temporal offset in DSP 338, i.e., the horizontal position of the respective pixels are shifted by DSP 338 such that the two images overlap. The fused signal thus produced is then compressed by compressor 341, and passed to the network 343 via processor 342. In an analog alternative embodiment, the fused video signal is converted into an analog signal by D/A converter 344, and the appropriate analog composite synchronization signals are added from sync generator 345. In either case, the camera enjoys the dual benefits of good sensitivity under poor lighting conditions due to the monochrome imager, as well as producing a color image due to the inclusion of the color imager.

Figure 34:
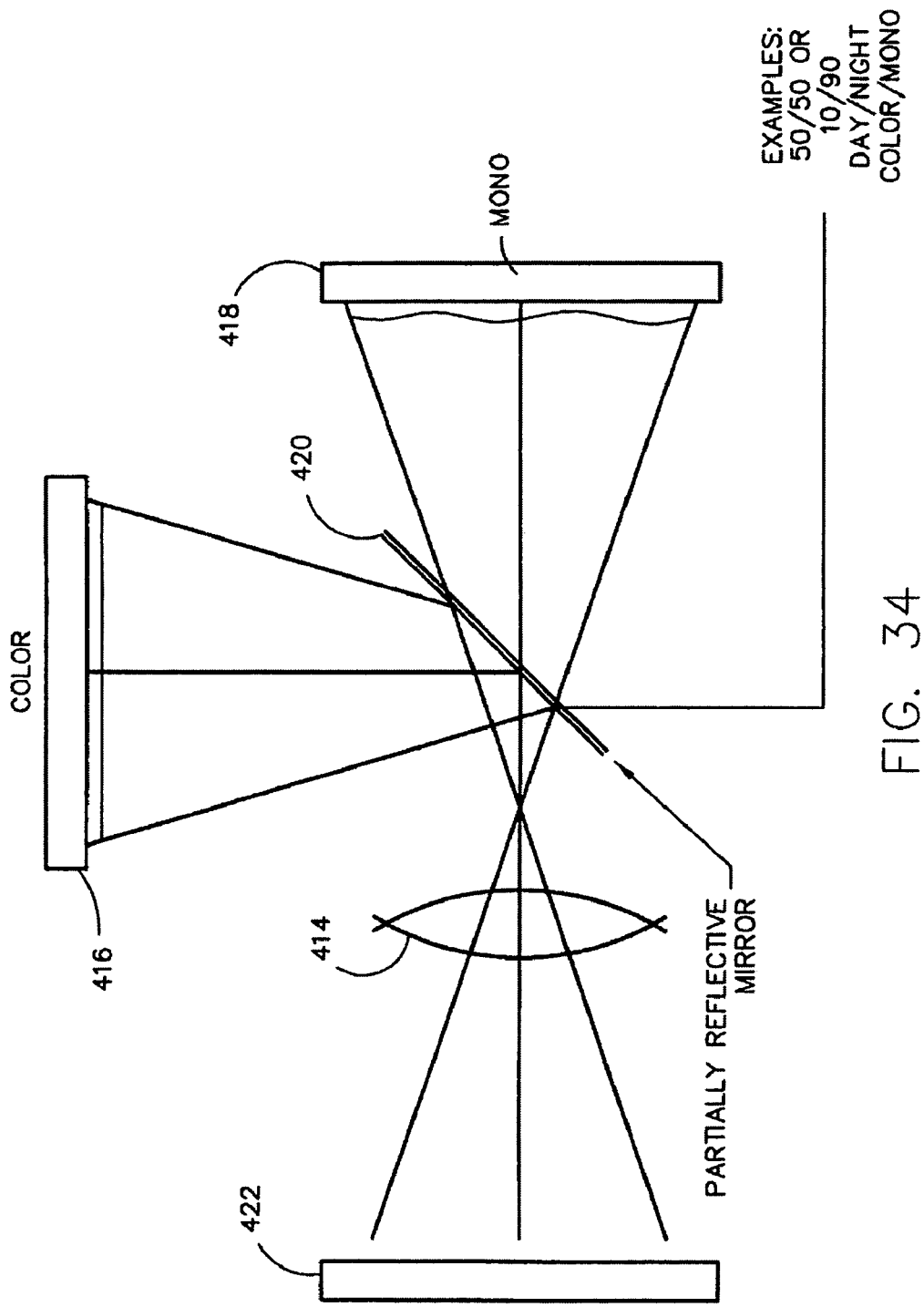
FIG. 34 illustrates optical fusing of the respective images.

An optical method for fusing monochrome and color imagers is depicted in FIG. 34. A desired scene 422 is transferred by lens 414 to a partially silvered mirror 420. The scene is then transferred to both a color imager 416 and a monochrome imager 418. Both imagers thus render the desired scene simultaneously. The partially silvered mirror 420 may be have a transmittance/reflectance ration of 50/50, 10/90, or other depending on the respective sensitivities of the imagers and upon the desired optical dynamic range of the system. As before, this approach effectively overcomes the color camera's poor sensitivity under poor illumination.

Figure 35:
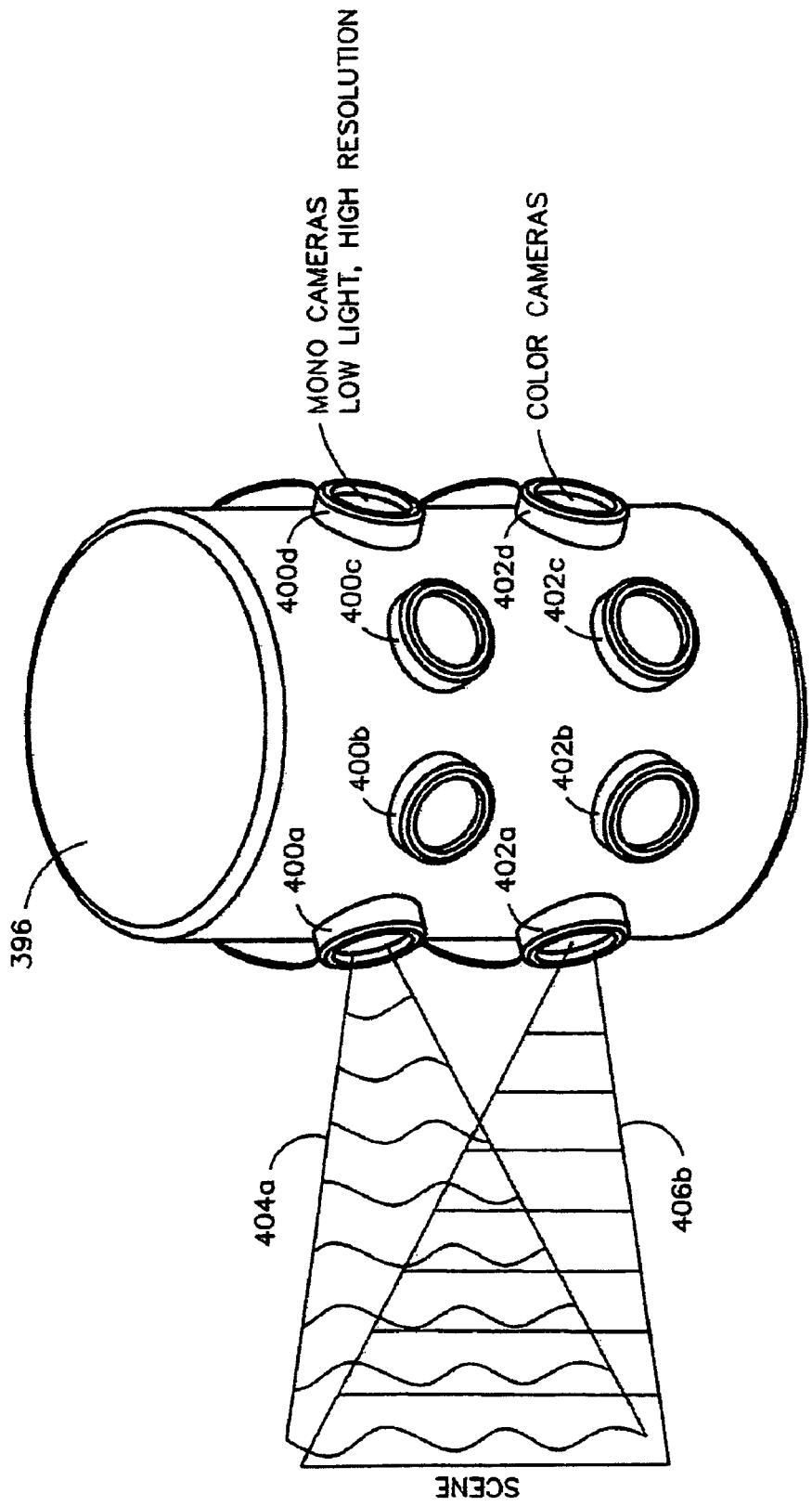
FIG. 35 depicts a cylindrical housing with pairs of color and monochrome cameras.

FIGS. 35 and 36 are perspective views of various forms of the day/night camera. In FIG. 35, a dual-row cylindrical camera housing 396 is depicted. The top row of cameras, 400a through 400h (400e-400h not visible) are monochrome cameras which exhibit superior sensitivity under low-light conditions. The lower row of cameras, 402a through 402h (402e-402h not visible) are color cameras, as previously described. Since the respective cameras 400a and 402a, etc., are vertically offset, it is necessary to offset the vertical timing of the respective imagers if it is desired to fuse their respective scenes. Otherwise, the cameras may simply be multiplexed as in FIG. 32. In FIG. 36, a semicircular array of stacked color/monochrome cameras are depicted. As in FIG. 35, the respective cameras may be multiplexed or fused. If fused, a vertical offset must be added to the respective imagers to correct the vertical parallax.

While certain features and embodiments of the invention have been described in detail herein it should be understood that the invention includes all improvements, modifications and enhancements within the scope and spirit of the following claims.

What is claimed is:

1. Apparatus for surveillance of an area, the area, including at least one monitored zone, said apparatus being configured for communication with an internet protocol network, the internet protocol network being configured for communication with at least one monitoring station configured for displaying compressed digital image data transmitted from the apparatus over the internet protocol network to the monitoring station, said apparatus comprising:

a video camera positioned to collect image data of a monitored zone;

said video camera including an analog to digital converter operable to provide digital image data, the digital image data corresponding to collected image data;

said video camera including a compressor in communication with the analog to digital converter to receive digital image data, said compressor being operable to compress the digital image data to provide compressed digital image data;

said video camera including digital storage in communication with at least one of said analog to digital converter and said compressor to receive the compressed digital image data, said digital storage being configured for retrieval from said digital storage a retrieved selection of the compressed digital image data, the retrieved selection of the compressed digital image data being retrieved upon occurrence of a triggering event, the retrieved selection of the compressed digital image data having a retrieved image resolution;

said video camera being configured for communication with the internet protocol network, said video camera being configured to transmit to the internet protocol network the retrieved selection of the compressed digital image data, said video camera being configured to transmit to the internet protocol network other of the compressed digital image data, the other of the compressed digital image data being transmitted to the internet protocol network without being retrieved from said digital storage, the other of the compressed digital image data being transmitted to the internet protocol network upon occurrence of the triggering event, the other of the compressed digital image data upon being transmitted to the internet protocol network on a near real-time basis, the other of the compressed digital image data having a respective other image resolution, the respective other image resolution being less than the retrieved image resolution;

whereby transmission of both the retrieved selection of the compressed digital image data and the other of the compressed digital image data provides for display at the at least one monitoring station both of the following:
  for display on a near real-time basis the other of the compressed digital image data, and
  for display on a time-delayed basis the retrieved selection of the compressed digital image data, the retrieved selection of the compressed digital image data originating before termination of one of the following:
    transmission of the other of the compressed digital image data, and
    the triggering event.

2. Apparatus for surveillance of an area according to claim 1 and further comprising:
  wherein the area includes a plurality of monitored zones;
    a plurality of said video cameras, each positioned to collect image data of a corresponding one of the monitored zones.

3. Apparatus for surveillance of an area according to claim 1 and further comprising:
  said video camera being configured to transmit the other of the compressed digital image data to the internet protocol network on a near real time basis, the other of the compressed digital image data being transmitted to the internet protocol network subsequent to transmission of the retrieved selection of the compressed digital image data.

4. Apparatus for surveillance of an area according to claim 1 and further comprising:
  whereby transmission of both the retrieved selection of the compressed digital image data and the other of the compressed digital image data provides for display at the at least one monitoring station both of the following:
    for display on a near real-time basis the other of the compressed digital image data, and
    for display on a time-delayed basis the retrieved selection of the compressed digital image data, the retrieved selection of the compressed digital image data originating before termination of transmission of the other of the compressed digital image data.

5. Apparatus for surveillance of an area according to claim 1 and further comprising:
  whereby transmission of both the retrieved selection of the compressed digital image data and the other of the compressed digital image data provides for display at the at least one monitoring station both of the following:
    for display on a near real-time basis the other of the compressed digital image data of the zone, and
    for display on a time-delayed basis the retrieved selection of the compressed digital image data of the zone, the retrieved selection of the compressed digital image data originating before termination of the triggering event.

6. Apparatus for surveillance of an area, the area including a plurality of monitored zones, said apparatus being configured for communication with an internet protocol network to enable display of compressed digital image data transmitted from the apparatus over the internet protocol network to a monitoring station, said apparatus comprising:

a plurality of video cameras positioned to collect image data, each video camera corresponding to a respective monitored zone;

each video camera including an analog to digital converter operable to provide digital image data, the digital image data corresponding to collected image data;

each video camera including a compressor in communication with the analog to digital converter to receive digital image data, said compressor being operable to compress the digital image data to provide compressed digital image data;

each video camera including digital storage in communication with at least one of said analog to digital converter and said compressor to receive the compressed digital image data, said digital storage being configured for retrieval from said digital storage a retrieved selection of the compressed digital image data, the retrieved selection of the compressed digital image data being retrieved upon occurrence of a triggering event in the area, the retrieved selection of the compressed digital image data having a retrieved image resolution;

each video camera being configured for communication with the internet protocol network, each video camera being configured to transmit to the internet protocol network the retrieved selection of the compressed digital image data, each said video camera being configured to transmit to the internet protocol network other of the compressed digital image data, the other of the compressed digital image data being transmitted to the internet protocol network without being retrieved from said digital storage, the other of the compressed digital image data being transmitted to the internet protocol network upon occurrence of the triggering event, the other of the compressed digital image data upon being transmitted to the internet protocol network on a near real-time basis, the other of the compressed digital image data having a respective other image resolution, the respective other image resolution being less than the retrieved image resolution;

whereby transmission of both the retrieved selection of the compressed digital image data and the other of the compressed digital image data provides for display at the at least one monitoring station both of the following:

for display on a near real-time basis the other of the compressed digital image data of the zone, and for display on a time-delayed basis the retrieved selection of the compressed digital image data of the zone, the retrieved selection of the compressed digital image data originating before termination of one of the following:

transmission of the other of the compressed digital image data, and the triggering event.

7. Apparatus for surveillance of an area according to claim 6 and further comprising:

a plurality of said video cameras, each positioned to collect image data of a corresponding one of the monitored zones.

8. Apparatus for surveillance of an area according to claim 6 and further comprising:

said video camera being configured to transmit the other of the compressed digital image data of the zone to the internet protocol network on a near real time basis, the other of the compressed digital image data of the zone being transmitted to the internet protocol network subsequent to transmission of the retrieved selection of the compressed digital image data of the zone.

9. Apparatus for surveillance of an area according to claim 6 and further comprising:

whereby transmission of both the retrieved selection of the compressed digital image data and the other of the compressed digital image data provides for display at the at least one monitoring station both of the following:

for display on a near real-time basis the other of the compressed digital image data of the zone, and for display on a time-delayed basis the retrieved selection of the compressed digital image data of the zone, the retrieved selection of the compressed digital image data originating before termination of transmission of the other of the compressed digital image data.

10. Apparatus for surveillance of an area according to claim 6 and further comprising:

whereby transmission of both the retrieved selection of the compressed digital image data and the other of the compressed digital image data provides for display at the at least one monitoring station both of the following:

for display on a near real-time basis the other of the compressed digital image data of the zone, and for display on a time-delayed basis the retrieved selection of the compressed digital image data of the zone, the retrieved selection of the compressed digital image data originating before termination of the triggering event.

\* \* \* \* \*

(12) INTER PARTES REVIEW CERTIFICATE (64th)
United States Patent     (10) Number:    US 7,733,371 K1
Monroe     (45) Certificate Issued:    Mar. 23, 2015

(54) DIGITAL SECURITY MULTIMEDIA SENSOR

(75) Inventor:    David A. Monroe

(73) Assignee:    E-Watch, Inc.

Trial Number:

IPR2013-00334 filed Jun. 7, 2013

Petitioner:     Mobotix Corp.

Patent Owner: E-Watch, Inc.

Inter Partes Review Certificate for:

Patent No.:    7,733,371
     Issued:        Jun. 8, 2010
     Appl. No.:     11/272,647
     Filed:         Nov. 14, 2005

The results of IPR2013-00334 are reflected in this inter partes review certificate under 35 U.S.C. 318(b).

INTER PARTES REVIEW CERTIFICATE
U.S. Patent 7,733,371 K1
Trial No. IPR2013-00334
Certificate Issued Mar. 23, 2015

AS A RESULT OF THE INTER PARTES REVIEW PROCEEDING, IT HAS BEEN DETERMINED THAT:

Claims 1-10 are cancelled.

* * * * *